United States Patent [19]
Hashizume

[11] Patent Number: 6,152,566
[45] Date of Patent: Nov. 28, 2000

[54] PROJECTOR FOR MODULATING POLARIZED LUMINOUS FLUX

[75] Inventor: Toshiaki Hashizume, Suwa, Japan

[73] Assignee: Seiko Epson Corporation, Tokyo, Japan

[21] Appl. No.: 09/091,625

[22] PCT Filed: Oct. 30, 1997

[86] PCT No.: PCT/JP97/03982

§ 371 Date: Jun. 22, 1998

§ 102(e) Date: Jun. 22, 1998

[87] PCT Pub. No.: WO98/19206

PCT Pub. Date: May 7, 1998

[30] Foreign Application Priority Data

Oct. 30, 1996 [JP] Japan ..................................... 8-305736
Oct. 27, 1997 [JP] Japan ..................................... 9-311270

[51] Int. Cl.[7] .................................................. G03B 21/14
[52] U.S. Cl. ................................ 353/20; 353/31; 349/9
[58] Field of Search ................................ 353/20, 31, 33, 353/34, 37; 349/84, 5, 7, 8, 9

[56] References Cited

U.S. PATENT DOCUMENTS

| | | | |
|---|---|---|---|
| 4,850,685 | 7/1989 | Kamakura et al. | 353/31 |
| 5,264,951 | 11/1993 | Takanashi et al. | 359/53 |
| 5,374,968 | 12/1994 | Haven et al. | 353/20 |
| 5,541,673 | 7/1996 | Shioya et al. | 353/20 |
| 5,605,390 | 2/1997 | Brice et al. | 353/34 |
| 5,626,408 | 5/1997 | Heynderickx et al. | 353/20 |
| 5,743,610 | 4/1998 | Yajima et al. | 353/81 |
| 5,844,637 | 12/1998 | Katsumata | 349/8 |

FOREIGN PATENT DOCUMENTS

| | | |
|---|---|---|
| 0 646 828 A1 | 9/1994 | European Pat. Off. . |
| 2 658 925 | 8/1991 | France . |
| 64-11289 | 1/1989 | Japan . |
| 1-302385 | 12/1989 | Japan . |
| 2-151848 | 6/1990 | Japan ..................................... 353/20 |
| 3-152523 | 6/1991 | Japan . |
| 4-223456 | 8/1992 | Japan ..................................... 353/20 |
| 7-87529 | 3/1995 | Japan . |
| 7-218909 | 8/1995 | Japan . |
| 8-292411 | 11/1996 | Japan . |
| 8-304756 | 11/1996 | Japan . |
| 9-159983 | 6/1997 | Japan . |

*Primary Examiner*—William Dowling
*Attorney, Agent, or Firm*—Oliff & Berridge, PLC

[57] ABSTRACT

A λ/4 phase plate 821 is placed in an optical path between a blue light liquid crystal valve 811 and a cross-dichroic prism 813. S-polarized blue light incident on the blue Light liquid crystal light valve 811 is transmitted by an s-polarized light transmitting polarizer 811*a* without change, modulated by a liquid crystal panel 811*b* and a part thereof is converted into p-polarized light, and the p-polarized light is transmitted by a p-polarized light transmitting polarizer 811*c* to be emitted. The emitted p-polarized light is incident on the λ/4 phase plate and converted into circularly polarized light to be emitted, and is incident on the cross-dichroic prism 813. The circularly polarized light reflected from a red reflecting film 831 and a blue reflecting film 833 and incident on the λ/4 phase plate 821 again is converted into s-polarized light to be illuminated on the blue light liquid crystal valve 811, but is cut off by the p-polarized light transmitting polarizer 811*c* to prevent the influence on the liquid crystal panel 811*b*.

15 Claims, 15 Drawing Sheets

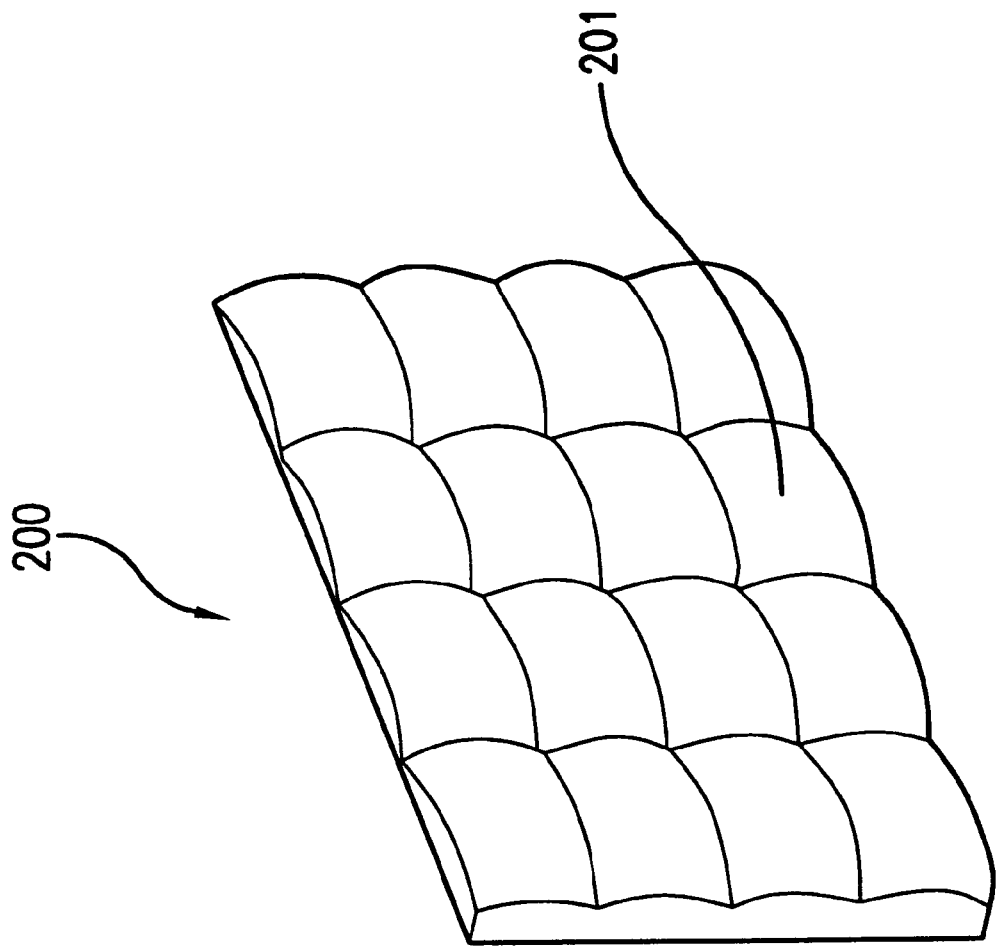
FIG. 3
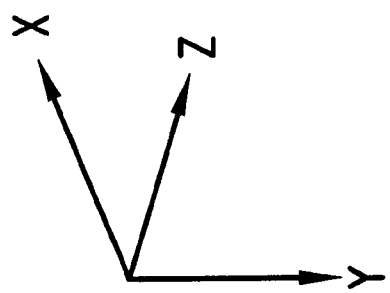

SPECTRAL DISTRIBUTION CHARACTERISTICS
OF HIGH-PRESSURE DISCHARGE LAMP

SPECTRAL REFLECTANCE CHARACTERISTICS OF
BLUE REFLECTING FILM 836 (45° INCIDENCE)

SPECTRAL REFLECTANCE CHARACTERISTICS OF CONVENTIONAL
BLUE REFLECTING FILM (45° INCIDENCE)

PROJECTOR FOR MODULATING POLARIZED LUMINOUS FLUX

BACKGROUND OF THE INVENTION

1. Field of the Invention

This invention relates to a projection display device for modulating polarized luminous flux by an optical modulation means in accordance with a given image signal to display an image on a projection surface.

2. Description of Related Art

As a projection display device utilizing polarized luminous flux, one described in Japanese Patent Publication No. Hei 1-302385 has been known. FIG. 17 schematically illustrates the construction of the main part of a conventional projection display device. This projection display device comprises three liquid crystal panels (liquid crystal light valves) 21, 23, 25 which are optical modulation means, a cross-dichroic prism 30 which is color light synchronizing means, and a projection lens 40 which is a projection optical system. Red light, blue light, and green light are incident on the three liquid crystal light valves 21, 23, 25, respectively, and color light of three colors is modulated and emitted in accordance with given image information (image signal). The cross-dichroic prism 30 synthesizes and emits color light of three colors in the direction of the projection lens 40. The projection lens 40 projects light which represents a synthesized color image on a screen 50. More specifically, in the cross-dichroic prism 30, a red reflecting film 31 for reflecting red light only, and a blue reflecting film 33 for reflecting blue light only are formed almost crosswise. Therefore, the red light is reflected from the red reflecting film 31, the blue light is reflected from the blue reflecting film 33, and the green light is transmitted by the red reflecting film 31 and the blue reflecting film 33 to be emitted from the cross-dichroic prism 30. The color light of three colors emitted from the cross-dichroic prism 30 is projected on the screen 50 by the projection lens 40, so that a synchronized image of color light of three colors is projected.

Ideally the red reflecting film 31 and the blue reflecting film 33 totally reflect the respective color light and transmit all green light. Actually, however, they reflect green light to some extent, and transmit the color light which should be reflected to some extent. For example, as shown in FIG. 17, some blue light in the blue light emitted from the liquid crystal light valve 23 is reflected from the blue reflecting film 33 and the red reflecting film 31, and the reflected light (return light) BRB illuminates the emitting surface of the liquid crystal light valve 23. A modulation control element for controlling the modulation of light is placed on the side of the emitting surface of the liquid crystal light valve 23, and energy of the return light BRB causes an incorrect operation of the modulation control element. Therefore, there may be a case where an incorrect modulation of light is performed in the liquid crystal light valve 23, and an incorrect image is displayed.

SUMMARY OF THE INVENTION

It is an object of this invention to prevent the optical modulation means from causing an incorrect operation by return light from color light synthesizing means as in the prior art, and to provide a technique for effectively preventing an incorrect image display in a projection display device.

In order to solve at least a part of the above-described problem, a first projection display device comprises:

a light source;

color separating means for separating light from the light source into first, second and third color light;

first, second, and third optical modulation means for respectively modulating the first, second, and third color light on the basis of a given image signal to emit first, second, and third modulated light, respectively, which are predetermined linearly polarized light; and color light synthesizing means for synthesizing the first, second and third modulated light, wherein the color light synthesizing means has a first reflecting film for reflecting the first color light, and a second reflecting film for reflecting the third color light, the first reflecting film and the second reflecting film being arranged in an X shape, and wherein polarization axis adjustment means is provided between at least one of the first, second and third optical modulation means and the color light synthesizing means.

The modulated light emitted from the optical modulation means is predetermined linearly polarized light capable of passing through a polarizer provided on the side of the emitting surface of the optical modulation means. Of such predetermined linearly polarized light, return light passing through the polarization axis adjustment means to be reflected from the first and second reflecting films of the color light synthesizing means, and passing through the polarization axis adjustment means becomes linearly polarized light having a polarization axis different from the polarization direction (hereinafter, referred to as the polarization axis) of the linearly polarized light emitted from the optical modulation means. This allows the return light to be absorbed by the polarizer provided on the emitting side surface of the optical modulation means, so that the optical modulation means can be prevented from causing incorrect operation due to the return light from the color light synthesizing means, and incorrect image display in the projection display device can be prevented.

In the above first projection display device, the polarization axis adjustment means for converting linearly polarized light into circularly polarized light may be preferably provided.

This allows the predetermined linearly polarized light emitted from the optical modulation means to be converted into circularly polarized light by the polarization axis adjustment means. Of the circularly polarized light, the return light reflected from the first and second reflecting films of the color light synthesizing means can become linearly polarized light having a polarization axis different from the polarization axis of the linearly polarized light emitted from the optical modulation means by passing through the polarization axis adjustment means again. This allows the return light to be absorbed by the polarizer provided on the emitting side surface of the optical modulation means, so that the optical modulation means can be prevented from causing incorrect operation due to the return light from the color light synthesizing means, and incorrect image display in the projection display device can be prevented.

In this case, the polarization axis adjustment means may be a λ/4 phase plate. If the λ/4 phase plate is placed in such a manner that a vertical angle formed by the optical axis thereof and the polarization axis of the linearly polarized light emitted from the optical modulation means is 45 degrees, the linearly polarized light input to the λ/4 phase plate can be easily converted into the circularly polarized light. Such circularly polarized light can be converted into linearly polarized light having a polarization axis different by 90 degrees from the polarization axis of the linearly polarized light initially incident from the optical modulation means by passing through the λ/4 phase plate again.

In addition, in the above first projection display device, the polarization axis adjustment means for adjusting the polarization axis of linearly polarized light to have a predetermined angle with respect to the line of intersection of the first reflecting film and the second reflecting film may be preferably provided.

The linearly polarized light converted by the polarization axis adjustment means so that the polarization axis has a predetermined angle with respect to the line of intersection of the first reflecting film and the second reflecting film, when it is incident on the color light synthesizing means to be reflected from the first reflecting film and the second reflecting film, becomes return light of linearly polarized light whose polarization axis has a predetermined angle symmetrical about the line of intersection. When the return light passes through the polarization axis adjustment means again, it becomes linearly polarized light having a polarization axis different from the polarization axis of the linearly polarized light emitted from the optical modulation means. This allows a polarization component of the return light having the polarization axis the same as the polarization direction of a polarizer provided on the emitting side surface of the optical modulation means to be absorbed by the polarizer, so that the optical modulation means can be suppressed from causing incorrect operation due to the return light from the color light synthesizing means, and incorrect image display in the projection display device can be suppressed. Incidentally, a polarization component of the polarization axis the same as that of the light emitted from the optical modulation means may be included in the linearly polarized light having the different polarization axis. However, since the amount thereof is small as compared with a case where all the return light is linearly polarized light having the polarization axis same as that of the light emitted from the optical modulation means, the influence thereof is little.

In this case, the polarization axis adjustment means may beg a λ/2 phase plate.

If the λ/2 phase plate is placed in such a manner that a vertical angle formed by the optical axis thereof and the horizontal or vertical polarization axis of the linearly polarized light emitted from the optical modulation means is one-half the predetermined angle, the linearly polarized light whose polarization axis is horizontal or vertical can be converted into linearly polarized light whose polarization axis has a predetermined angle with respect to the line of intersection of the first reflecting film and the second reflecting film. Since the return light which returns after being reflected from the first reflecting film and the second reflecting film is inclined in the direction opposite to the above line of intersection, it can se converted into linearly polarized light having a polarization axis different from the polarization axis of the linearly polarized light emitted from the optical modulation means when passing through the λ/2 phase plate again.

Here, the predetermined angle may be any angle in the range of about 10 degrees to about 45 degrees. However, the range of 45 degrees to 90 degrees of the polarization axis with respect to the line of intersection is equivalent to the range of 45 degrees to 0 degree, and the above range of about 10 degrees to 45 degrees is equivalent to the range of about 80 degrees to about 45 degrees. This can reduce a polarization component having the same polarization axis as that of the linearly polarized light emitted from the optical modulation means in polarization components of the return light in response to the width of the predetermined angle. Particularly, if the predetermined angle is set within the range of about 22.5 degrees to about 45 degrees, the ratio of the polarization component having the same polarization axis as that of the linearly polarized light emitted from the optical modulation means can be reduced to about 50% or less. This can suppress the optical modulation means from causing incorrect operation due to the return light from the color light synthesizing means, and suppress incorrect image display in the projection display device.

Particularly, the predetermined angle may be preferably about 45 degrees. This can be made possible by placing the λ/2 phase plate in such a manner that a vertical angle formed by the optical axis thereof and the polarization axis of the linearly polarized light emitted from the optical modulation means is 22.5 degrees. This allows the polarization axis of the return light which returns after being reflected from the first and second reflecting films is inclined in the direction opposite to the polarization axis of the light emitted from the λ/2 phase plate with respect to the line of intersection of the first reflecting film and the second reflecting film, so that the return light can be converted into linearly polarized light rotated 90 degrees with respect to the polarization axis of the linearly polarized light emitted from the optical modulation means when passing through the λ/2 phase plate again. Since most of the linearly polarized light rotated 90 degrees is absorbed by the polarizer provided on the side of the emitting surface of the optical modulation means, the optical modulation means can be prevented from causing incorrect operation due to the return light from the color light synthesizing means, and incorrect image display in the projection display device can be prevented.

In the above first projection display device, it may be preferable that a modulation control element is formed on the optical modulation means, and the polarization axis adjustment means is provided between the optical modulation means for the color light of relatively short wavelength in the first, second and third color light and the color light synthesizing means.

The incorrect operation of the modulation means is susceptible to the light on the side of the short wavelength. Therefore, this can prevent the color light of relatively short wavelength from illuminating the modulation control element, so that the optical modulation means can be effectively prevented from causing incorrect operation due to the return light from the color light synthesizing means, and incorrect image display in the projection display device can be prevented.

In addition, the polarization axis adjustment means may be provided between the optical modulation means for the color light having a relatively high spectral intensity in the first, second and third color light and the color light synthesizing means.

This allows the return light from the color light synthesizing means for the color light having a relatively high spectral intensity in the first, second and third color light, i.e., the color light having a relatively high spectral peak, to be absorbed by the polarizer provided on the emitting side surface of the optical modulation means, so that the optical modulation means can be prevented from causing incorrect operation due to the return light from the color light synthesizing means, and incorrect image display in the projection display device can be prevented A second projection display device comprises:

a light source;

color separating means for separating light from the light source into first, second and third color light;

first, second, and third optical modulation means for respectively modulating the first, second, and third color light on the basis of a given image signal to emit first, second, and third modulated light, respectively, which are predetermined linearly polarized light; and color light synthesizing means for synthesizing the first, second and third modulated light, wherein the color light synthesizing means has a first reflecting film for reflecting the first color light, and a second reflecting film for reflecting the third color light, the first reflecting film and the second reflecting film being arranged in an X shape, wherein polarization axis adjustment means for adjusting a polarization axis of linearly polarized light to have a first predetermined angle with respect to the line of intersection of the first reflecting film and the second reflecting film is provided between the light source and at least one of the first, second, and third optical modulation means, and wherein, on the emitting side surface of the optical modulation means corresponding to the polarization axis adjustment means, a polarizer for transmitting only linearly polarized light emitted from the optical modulation means and having a polarization axis of a predetermined second angle with respect to the line of intersection of the first reflecting film and the second reflecting film is provided.

The light emitted from the polarization axis adjustment means by the polarization axis adjustment means provided between the light source and at least one of the first, second, and third optical modulation means is converted into linearly polarized light whose polarization axis has a predetermined first angle with respect to the line of intersection of the first reflecting film and the second reflecting film. A polarizer is provided on the emitting side surface of the optical modulation means, and transmits and emits only linearly polarized light having a polarization axis of a predetermined second angle with respect to the line of intersection. If the linearly polarized light emitted from the optical modulation means returns after being reflected from the first and second reflecting films of the color light synthesizing means, it becomes linearly polarized light in which the polarization axis of the return light has an angle different from the second angle with respect to the line of intersection of the linearly polarized light having the different polarization axis angle, a polarization component capable of being absorbed by the polarizer provided on the emitting side surface of the optical modulation means is absorbed, so that the return light to be incident on the optical modulation means can be suppressed. This can suppress the optical modulation means from causing incorrect operation due to the return light from the color light synthesizing means, and incorrect image display in the projection display device can be suppressed. Incidentally, a polarization component of the polarization axis the same as that of the light emitted from the optical modulation means may be included in the linearly polarized light having the different polarization axis angle. However, since the amount thereof is small as compared with a case where all the return light is linearly polarized light having the polarization axis the same as that of the light emitted from the optical modulation means, the influence thereof is little.

In the above second projection display device, the polarization axis adjustment means may be preferably a λ/2 phase plate.

If the λ/2 phase plate is placed in such a manner that a vertical angle formed by the optical axis thereof and the horizontal or vertical polarization axis of the linearly polarized light emitted from the optical modulation means is one-half the predetermined angle, the linearly polarized light whose polarization axis is horizontal or vertical can be converted into linearly polarized light whose polarization axis has a predetermined first angle with respect to the line of intersection of the first reflecting film and the second reflecting film.

Here, the first angle may be any angle in the range of about 10 degrees to about 45 degrees, and the second angle may be substantially equal to or substantially different by 90 degrees from the first angle. However, the range of 45 degrees to 90 degrees of the polarization axis with respect to the line of intersection is equivalent to the range of 45 degrees to 0 degree, and the above range of about 10 degrees to about 45 degrees is equivalent to the range of about 80 degrees to about 45 degrees. This can reduce a polarization component having the same polarization axis as that of the linearly polarized light emitted from the polarizer provided on the emitting side surface of the optizal modulation means in polarization components of the return light which returns after being reflected from the first and second reflecting films in response to the width of the first angle. Particularly, if the first angle is set within the range of about 22.5 degrees to about 45 degrees, the ratio of the polarization component having the same polarization axis as that of the linearly polarized light emitted from the optical modulation means can be reduced to about 50% or less. This can suppress the optical modulation means from causing incorrect operation due to the return light from the color light synthesizing means, and suppress incorrect image display in the projection display device.

Particularly, the first angle may be preferably about 45 degrees. This can be made possible by placing the λ/2 phase plate in such a manner that a vertical angle formed by the polarization axis thereof and the polarization axis of the linearly polarized light emitted from the polarizer provided on the emitting side surface of the optical modulation means is 22.5 degrees. This allows the polarization axis of the return light which returns after being reflected from the first and second reflecting films to be inclined in the direction opposite to the polarization axis of the linearly polarized light emitted from polarizer, so that the return light can be converted into linearly polarized light rotated 90 degrees with respect to the polarization axis of the linearly polarized light emitted from the polarizer. Since most of the linearly polarized light rotated 90 degrees is absorbed by the polarizer, the optical modulation means can be prevented from causing incorrect operation due to the return light from the color light synthesizing means, and incorrect image display in the projection display device can be prevented.

In the above first and second projection display devices, color absorption means for absorbing only color light passing through the polarization axis adjustment means may be provided in an optical path between the optical modulation means and the light synthesizing means where the polarization axis adjustment means is not provided.

BRIEF DESCRIPTION OF THE DRAWINGS

FIG. 3 is a perspective view showing the external appearance of a first optical element 200.

DETAILED DESCRIPTION OF PREFERRED EMBODIMENTS

A. First Embodiment

Figure 1:
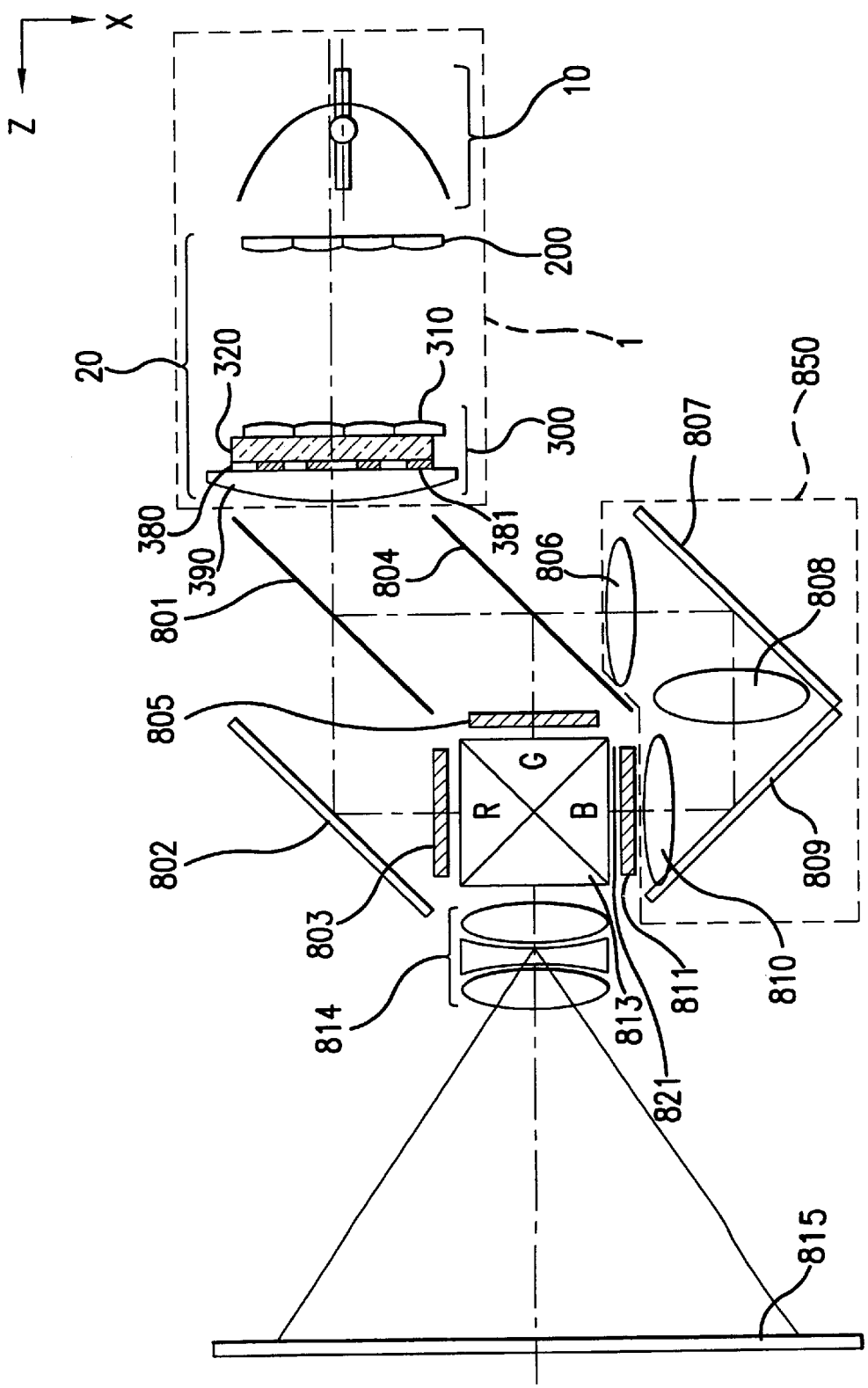
FIG. 1 is a schematic plan view of a projection display device according to a first embodiment.

Next, the mode for carrying out the present invention will be described on the basis of embodiments. FIG. 1 is a schematic plan view of a projection display device according to a first embodiment of the present invention.

This projection display device comprises a polarizing illumination device 1, dichroic mirrors 801, 804, reflecting mirrors 802, 807, 809, relay lenses 806, 808, 810, three liquid crystal panels (liquid crystal light valves) 803, 805, 811, a cross-dichroic prism 813, and a projection lens 814.

Figure 2:
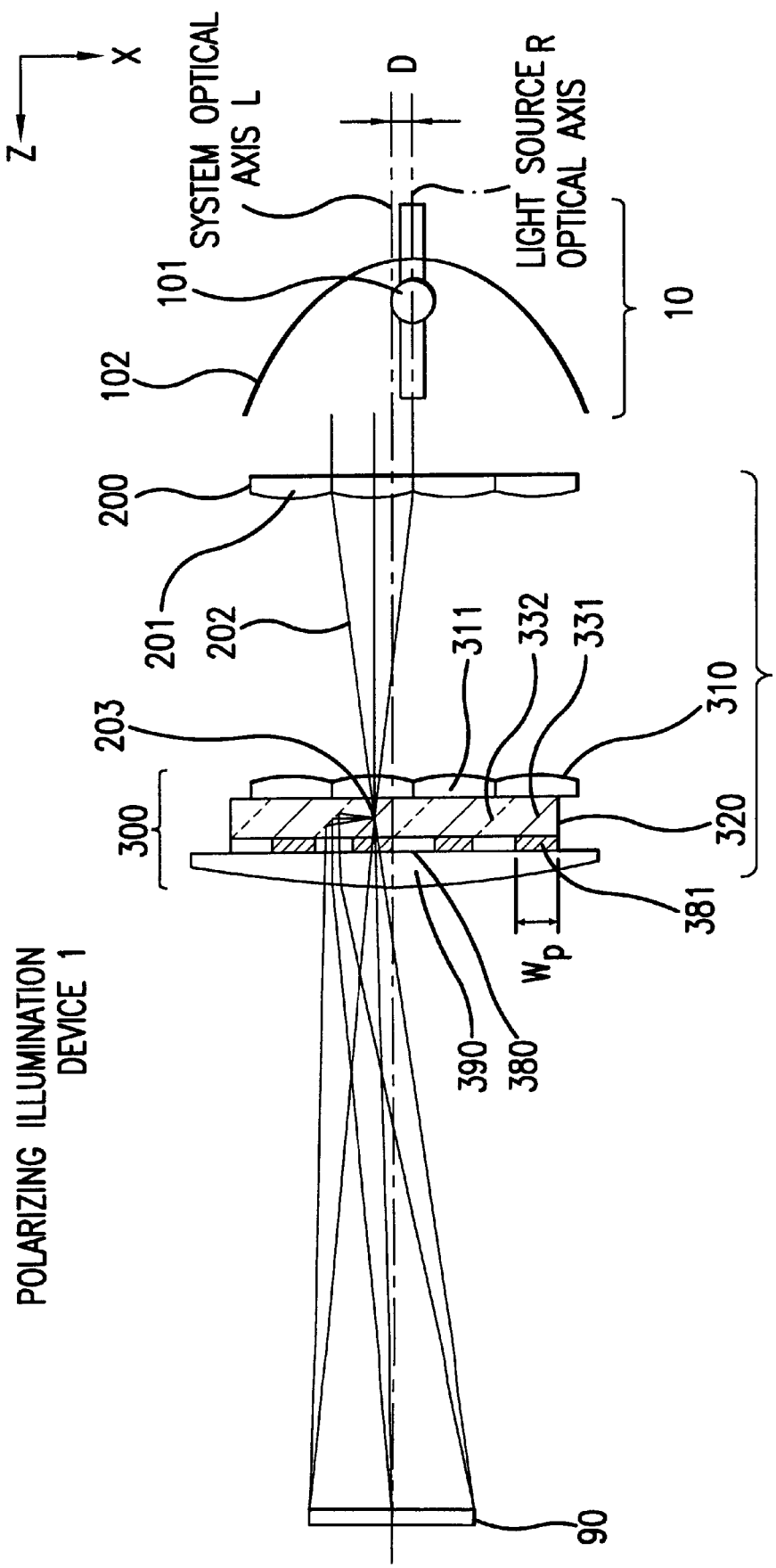
FIG. 2 schematically illustrates the construction of the main part of a polarizing illumination device 1 in plan view.

FIG. 2 schematically illustrates a construction of a main part of the polarizing illumination device 1 in a plan view. The polarizing illumination device 1 comprises a light source 10 and a polarized light generator 20. The light source 10 emits luminous flux of random polarization directions including a s-polarized light (vibrating wave perpendicular to an incident surface) component and a p-polarized light (vibrating wave parallel to the incident surface) component. Incidentally, in the following description, polarized light having a polarization axis in the direction perpendicular to the plane of the drawing is referred to as s-polarized light, and polarized light having a polarization axis in the direction parallel to the plane of the drawing is referred to as p-polarized light. The Luminous flux emitted from the light source 10 is converted into one kind of linearly polarized light of almost uniform polarization directions by the polarized light generator 20, and illuminates an illumination area 90. Incidentally, the illumination area 90 is equivalent to the three liquid crystal panels 803, 805, 811 in FIG. 1.

The light source 10 comprises a light source lamp 101 and a paraboloidal reflector 102. The light emitted from the light source lamp 101 is reflected in one direction by the paraboloidal reflector 102, and becomes substantially parallel luminous flux to be incident on the polarized light generator 20. A light source optical axis R of the light source 10 is shifted parallel to the X direction by a fixed distance D with respect to a system optical axis L. Here, the system optical axis L is an optical axis of a polarizing beam splitter array 320. The reason why the light source optical axis R is shifted will be described later.

The polarized light generator 20 comprises a first optical element 200 and a second optical element 300. FIG. 3. is a perspective view showing the external appearance of the first optical element 200. As shown in FIG. 3, the first optical element 200 has a construction such that a plurality of small luminous flux splitting lenses 201 each having a rectangular outline are arranged in a matrix. The first optical element 200 is arranged so that the light source optical axis R (FIG. 2) coincides with the center of the first optical element 200. The external shape of each of the luminous flux splitting lens 201 viewed in the Z direction is set to be similar to the shape of the illumination area 90, i.e., the shape of the liquid crystal light valves 803, 805, 811. In this embodiment, an aspect ratio (the ratio of length to width) of the luminous flux splitting lens 201 is set to 4:3.

The second optical element 300 of FIG. 2 comprises a condenser lens array 310, a polarizing beam splitter array 320, a selective phase plate 380, and a lens 390 on the emitting side. A construction of a polarizing conversion element comprising the polarizing beam splitter array 320 and the selective phase plate 380 is shown in FIG. 4. The polarizing beam splitter array 320 has a shape such that a plurality of columnar translucent plates 322, each having the shape of parallelogram in cross section, are adhered alternately. On the interfaces of the translucent plates 322, polarization separating films 331 and reflecting films 332 are alternately formed. Incidentally, this polarizing beam splitter array 320 is prepared by gluing a plurality of glass plates each having these polarization separating films 331 and the reflecting films 332, and by cutting diagonally at a predetermined angle so that the polarization separating films 331 and the reflecting films 332 are arranged alternately.

Figure 4A:
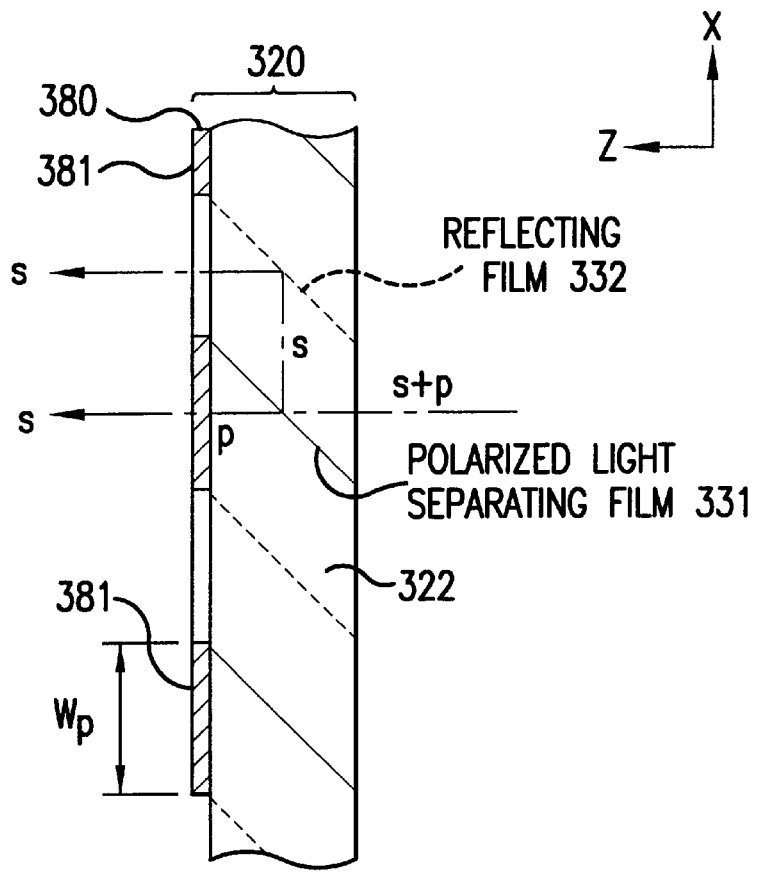
FIGS. 4A and 4B show illustrations of the construction of a polarized light-conversion device comprising a polarizing beam splitter array 320 and a selective phase plate 380.
Figure 4B:
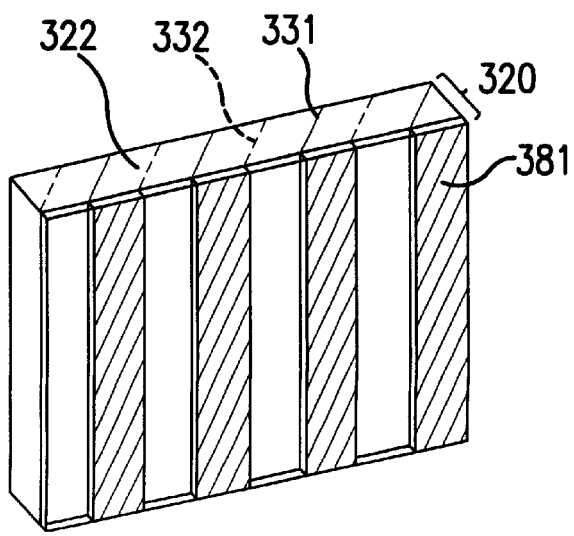

From the incident surface of the polarizing conversion element shown in FIG. 4(A), incident light having random polarization directions and including the s-polarized light component and the p-polarized light component is incident. This incident light is first split into s-polarized light and p-polarized light by the polarization separating films 331. The s-polarized light is reflected almost perpendicularly by the polarization separating film 331, and emitted after being further reflected perpendicularly by the reflecting films 332. On the other hand, the p-polarized light is transmitted by the polarization separating films 331 without change. The selective phase plate 380 has $\lambda/2$ phase layers 381 formed on the light emitting surfaces, where the light transmitted through the polarization separating films 331 passes, and the light emitting surface portions of the light which is reflected by the reflecting films 332 are colorless and transparent optical elements. Therefore, the p-polarized light transmitted by the polarization separating films 331 is converted into s-polarized light by the $\lambda/2$ phase layers 381, and then emitted. Therefore, almost all of the light passing through the polarizing conversion element is emitted as s-polarized light.

The condenser lens array 310 shown in FIG. 2 has almost the same construction as that of the first optical element 200 (FIG. 3). That is, the condenser lens array 310 is formed by arranging the same number of condenser lenses 311 as that of the luminous flux splitting lenses 201 constituting the first optical element 200 in the form of a matrix. The center of the condenser lens array 310 is also arranged so as to coincide with the light source optical axis R.

The light source 10 emits substantially parallel white luminous flux having random polarization directions. The luminous flux emitted from the light source 10 and incident on the first optical element 200 is split into intermediate luminous flux 202 by respective luminous flux splitting lenses 201. The intermediate luminous flux 202 is converged within a plane perpendicular to the system optical axis L through the light-condensing action of the luminous flux splitting lenses 201 and the condenser lenses 311. At the position where the intermediate luminous flux 202 is converged, the same number of light source images as that of the luminous flux splitting lenses 201 are formed. Incidentally, the positions where the light source images are formed are in the vicinity of the polarization separating films 331 within the polarizing beam splitter array 320.

The light source optical axis R is shifted from the system optical axis L in order to form the light source images at the position of the polarization light separating films 331. The amount of shift D is set to ½ of the width Wp (FIG. 2) of the polarization separating film 331 in the X direction. As described above, the centers of the light source 10, the first optical element 200 and the condenser lens array 310 coincide with the light source optical axis R, and are shifted from the system optical axis L by D=Wp/2. On the other hand, it is apparent from FIG. 2 that the centers of the polarization separating films 331 for separating the intermediate luminous flux 202 are also shifted from the system optical axis L by Wp/2. Therefore, by shifting the light source optical axis R from the system optical axis L by Wp/2, a light source image of the light source lamp 101 can be formed in almost the centers of the polarization separating films 331.

The whole luminous flux incident on the polarizing beam splitter array 320 is, as shown in the above-described FIG. 4(A), converted into s-polarized light. The luminous flux emitted from the polarization beam splitter array 320 illuminates the illumination area 90 with the lens 390 on the emitting side. Since the illumination area 90 is illuminated by a number of luminous flux split by a number of luminous flux splitting lenses 201, the illumination area 90, i.e., the overall liquid crystal light valves 803, 805, 811 can be illuminated uniformly.

Incidentally, when the luminous flux incident on the first optical element 200 is excellent in parallelism, it is possible to omit the condenser lens array 310 from the second optical element 300.

As described above, the polarizing illumination device 1 shown in FIG. 2 functions as a polarized light generating section for converting white luminous flux having random polarization directions into luminous flux of a specific polarization direction (s-polarized light or p-polarized light), and a function of uniformly illuminating the illumination area 90, i.e., the liquid crystal light valves 803, 805, 811. In addition, since the polarizing beam splitter array 320 is used, it has the advantage of high usage efficiency of light.

The dichroic mirrors 801, 804 shown in FIG. 1 function as color light separating means for separating s-polarized white luminous flux into s-polarized light of the three colors red, blue and green. The three liquid crystal light valves 803, 805, 811 function as optical modulation means for modulating and emitting color light of three colors in accordance with given image information (image signal). The cross-dichroic prism 813 functions as color light synthesizing means for synthesizing and emitting color light of three colors in the direction of the projection lens 814. The projection lens 814 functions as a projection optical system for projecting light which represents a synthesized color image on a screen 815.

The blue-and-green-light-reflecting dichroic mirror 801 transmits the red light component of the s-polarized white luminous flux emitted from the polarization illuminating device 1, and reflects the blue light component and the green light component. The transmitted s-polarized red light is reflected from the reflecting mirror 802, and reaches the red light liquid crystal light valve 803. On the other hand, from the s-polarized blue light and green light reflected from the first dichroic mirror 801, the s-polarized green light is reflected by the green-light-reflecting dichroic mirror 804, and reaches the green light liquid crystal light valve 805. On the other hand, the s-polarized blue light is transmitted by the second dichroic mirror 804.

In this embodiment, the optical path of the blue light is the longest of all three color light paths. Thus, with respect to the s-polarized blue light, a light guide means 850 consisting of the relay lens system, which includes the incident lens 806, relay lens 808 and emitting lens 810, is provided at the back of the dichroic mirror 804. That is, the s-polarized blue light is first guided to the relay lens 808 through the incident lens 806 and the reflecting mirror 807 after being transmitted by the green-light-reflecting dichroic mirror 804. Further, the blue light is reflected by the reflecting mirror 809 to be guided to the emitting lens 810, and reaches the blue light liquid crystal panel 811.

The three liquid crystal light valves 803, 805, 811 modulate respective color light in accordance with an image signal (image information) given by a non-illustrated external control circuit, and produce color light including image information of respective color components. The red light modulated by the red light liquid crystal light valve 803, and the green light modulated by the green light liquid crystal light valve 805 are incident on the cross-dichroic prism 813. The blue light modulated by the blue light liquid crystal light valve 811 is transmitted by the λ/4 phase plate 821, and is incident on the cross-dichroic prism 813. The λ/4 phase plate 821 functions, as described later, as a polarization axis adjustment means for converting the polarization direction of the blue light from linearly polarized light into circularly polarized light, and from circularly polarized light into linearly polarized light.

The cross-dichroic prism 813 functions as a color light synthesizing means for synthesizing three color light to form a color image, and the three color light is synthesized and the synthesized light representing a color image is emitted to the projection lens 814. The synthesized light representing the color image is projected on the screen 815 by the projection lens 814 which is a projection optical system, and the image is enlarged and displayed.

Figure 5:
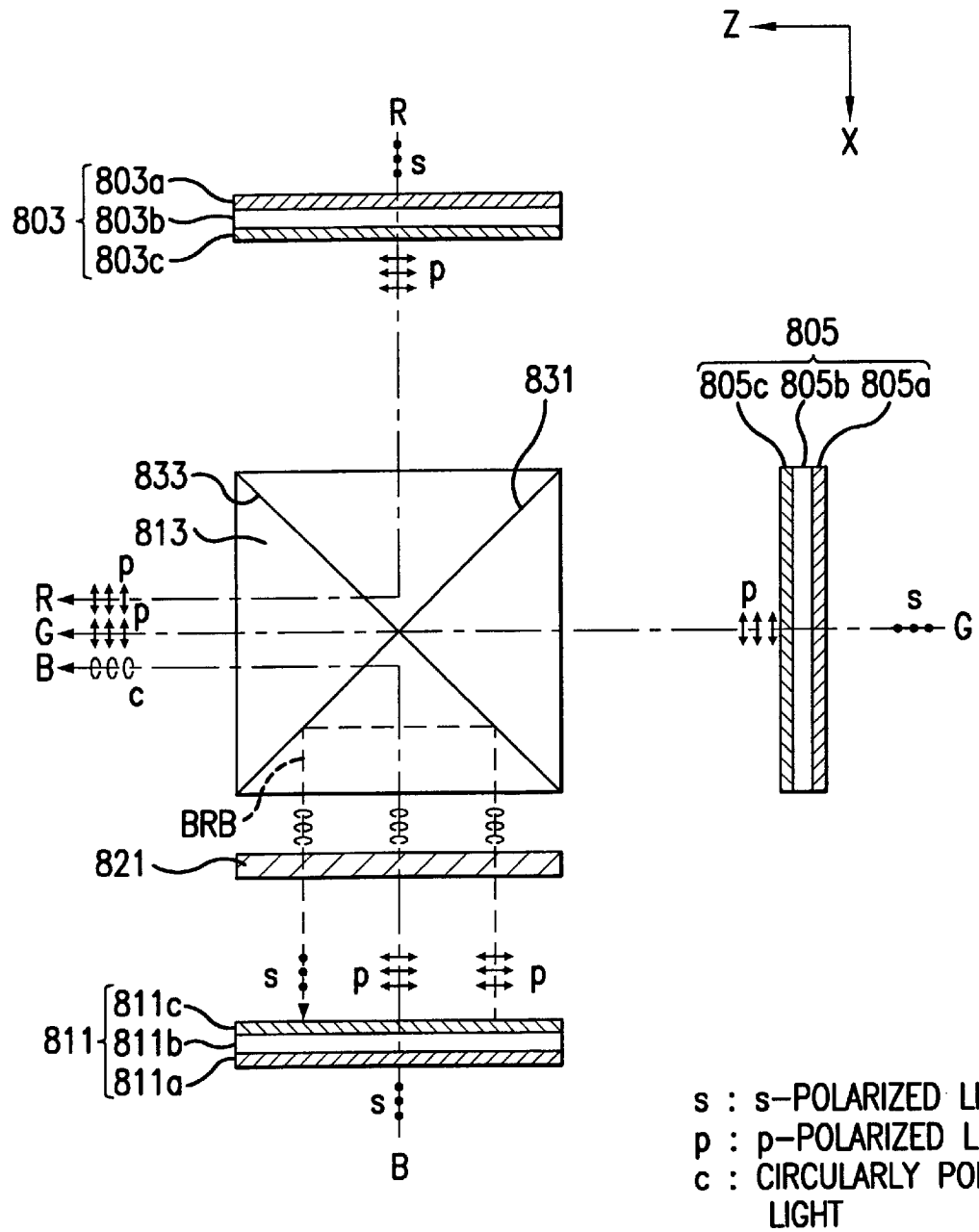
FIG. 5 illustrates the concept of the main part of the first embodiment.

According to the projection display device, the liquid crystal light valves 803, 805, 811 of the type for modulating luminous flux of a specific polarization direction (the s-polarized light or the p-polarized light) are used as the optical modulation means. As shown in FIG. 5, polarizing plates 803a, 805a, 81.1a, and polarizing plates 803c, 805c, 811c are normally glued on the side of the incident side and on the emitting side, respectively, of these liquid crystal light valves. The polarizer has a direction in which the polarized light can transmit (transmission axis) and a direction in which the polarized light is absorbed (absorption axis). The polarizing plates 803a, 805a, 811a on the incident side are provided so that transmission axes thereof coincide with the polarization axis of the s-polarized light, and are used to increase the purity of the s-polarized light component. According to the projection display device of this embodiment, since almost all light is changed to the light of one polarization type by the second optical element 300 to be emitted, it is possible to omit the polarizing plates on the side of the incident light. On the other hand, the polarizing plates 803*c*, 805*c*, 811*c* on the emitting side are provided so that the transmission axes thereof coincide with the polarization axis of the p-polarized light. The liquid crystal panels 803*b*, 805*b*, 811*b* are panels using a twisted nematic liquid crystal twisted at 90 degrees, and the incident linearly polarized light is modulated in accordance with the image signal to become elliptically polarized light in accordance with its drive voltage. And, only the p-polarized light component is transmitted by the polarizing plates 803*c*, 805*c*, 811*c* on the emitting side and is emitted from the liquid crystal light valves 803, 805, 811. That is, of the s-polarized light incident on the liquid crystal valves 803, 805, 811, only the portion modulated by the liquid crystal light valves 803, 805, 811 and converted into p-polarized light and emitted.

The reflecting films 332 of the polarizing beam splitter array 320 may be preferably formed by dielectric multilayer films having the property of selectively reflecting only a specific polarized light component (for example, the s-polarized light) which becomes the object of modulation of the liquid crystal light valves 803, 805, 811. This increases the purity of one kind of the polarized light component emitted from the second optical element 300, so that absorption of light and generation of heat at the incident polarizing plate of the liquid crystal light valves 803, 805, 811 can be suppressed.

FIG. 5 illustrates a concept of a main part of the first embodiment and shows the optical system composed of the liquid crystal light valves 803, 805, 811, the λ/4 phase plate 821, and the cross-dichroic prism 813 with an attention to the polarization direction.

In the first embodiment, the s-polarized white light is emitted from the polarization lighting device 1, and is split into color light of the three colors red, green and blue by two dichroic mirrors 801, 804, as described above. Since the polarization direction is not changed when passing through the dichroic mirrors 801, 804, the light of three colors remains as s-polarized light.

The red light liquid crystal light valve 803 is composed of the liquid crystal panel 803*b*, the s-polarized transmitting polarizing plate 803*a* provided on the side of incident light of the liquid crystal panel 803*b*, and the p-polarized transmitting polarizing plate 803*c* provided on the emitting side. The s-polarized red light incident on the red light liquid crystal light valve 803 is transmitted by the s-polarized transmitting polarizing plate 803*a* without change, modulated by the liquid crystal panel 803*b* and a part thereof is converted into p-polarized, and only the p-polarized light is transmitted by the p-polarized transmitting polarizing plate 803*c* to be emitted. The emitted p-polarized red light is incident on the cross-dichroic prism 813.

The green light liquid crystal light valve 805 is composed of the liquid crystal panel 805*b*, the s-polarized transmitting polarizing plate 805*a* provided on the incident side of the liquid crystal panel 805*b*, and the p-polarized transmitting polarizing plate 805*c* provided on the emitting side. The s-polarized green light incident on the green light liquid crystal light valve 805 is transmitted by the s-polarized transmitting polarizing plate 805*a* without change, modulated by the liquid crystal panel 805*b* and a part thereof is converted into p-polarized light, and only the p-polarized light is transmitted by the p-polarized transmitting polarizing plate 805*c* to be emitted. The emitted p-polarized green light is incident on the cross-dichroic prism 813.

The blue light liquid crystal light valve 811 is composed of the liquid crystal panel 811*b*, the s-polarized transmitting polarizing plate 811*a* provided on the side of the incident light of the liquid crystal panel 811*b*, and the p-polarized transmitting polarizing plate 811*c* provided on the emitting side. The s-polarized blue light incident on the blue light liquid crystal light valve 811 is transmitted by the s-polarized transmitting polarizing plate 811*a* without change, modulated by the liquid crystal panel 811*b* and a part thereof is converted into p-polarized light, and only the p-polarized light is transmitted by the p-polarized transmitting polarizing plate 811*c* to be emitted. The p-polarized blue light emitted from the p-polarized transmitting polarizing plate 811*c* is incident on the λ/4 phase plate 821, converted into circularly polarized light to be emitted, and incident on the cross-dichroic prism 813.

In the cross-dichroic prism 813, a red reflecting film 831 and a blue reflecting film 833 are formed in substantially an X shape. The p-polarized red light emitted from the red light liquid crystal light valve 803 is reflected from the red reflecting film 831, and emitted in the direction of the projection lens 814 (FIG. 1). In addition, the p-polarized blue light emitted from the blue light Liquid crystal light valve 811 is reflected from the blue reflecting film 833 and emitted in the direction of the projection lens 814 after being converted into the circularly polarized light by the λ/4 phase plate 821. The green light emitted from the green light liquid crystal light valve 805 is transmitted by the red reflecting film 831 and the blue reflecting film 833 without change, and is emitted in the direction of the projection lens 814. The projection lens 814 projects light representing an incident color image on the screen 815 (FIG. 1). Incidentally, in FIG. 5, the positions where the red light and the blue light are reflected are drawn at positions shifted more or less from the respective reflecting films for convenience as shown in the drawings.

Figure 6:
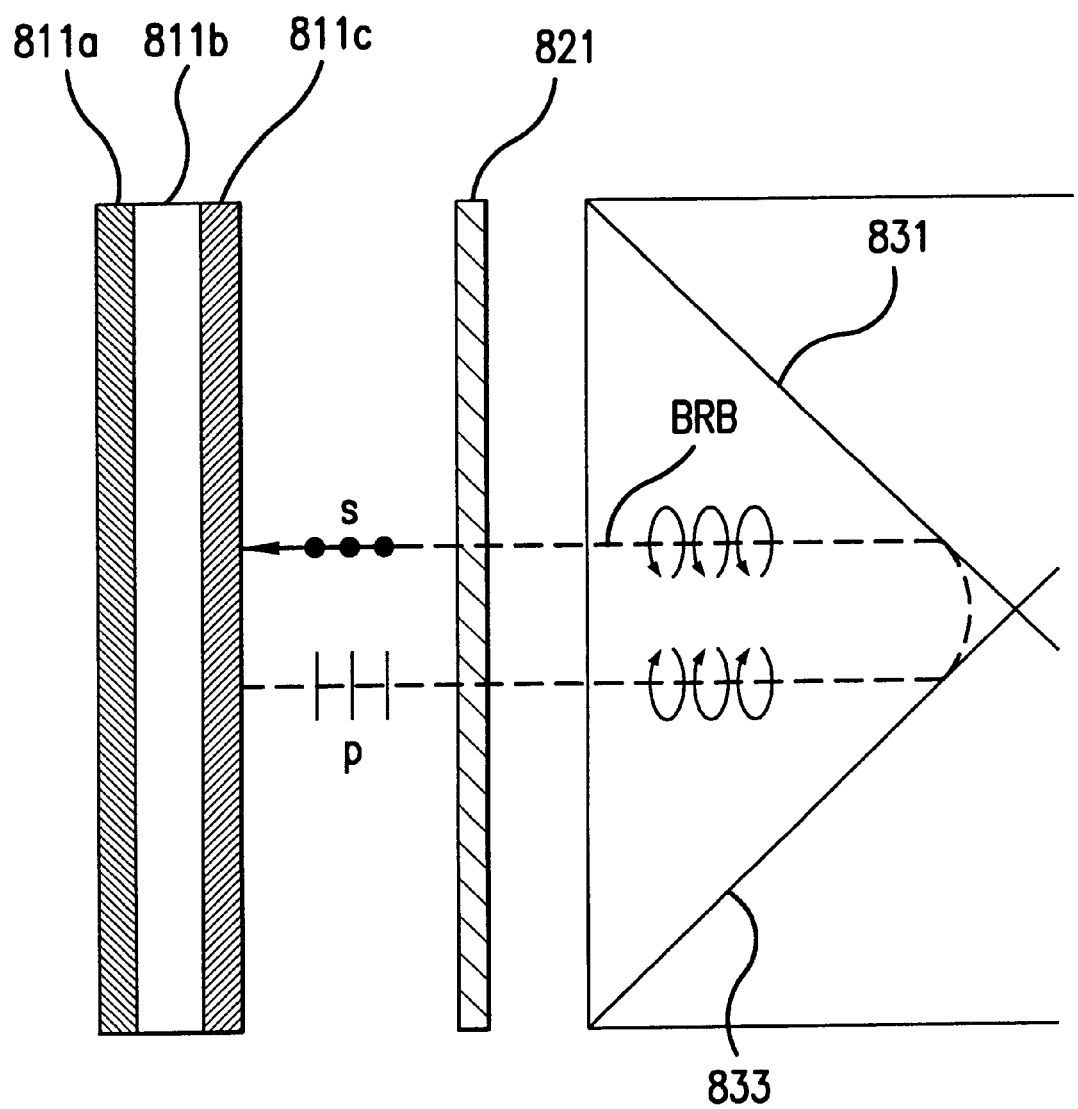
FIG. 6 is an illustration showing return light BRB.

Here, as shown in FIG. 6, of the circularly polarized blue light incident on the cross-dichroic prism 813, the light reflected without being transmitted by the red reflecting film 831 after being reflected from the blue reflecting film 833, i.e., return light BRB illuminates the emitting side surface of the blue light liquid crystal light valve 811 after being incident on the λ/4 phase plate 821 again, converted into s-polarized light, and emitted. However, since the p-polarized transmitting polarizing plate 811*c*, which does not transmit the s-polarized light, is present on the emitting side surface of the blue light liquid crystal light valve 811, the return light BRB converted into s-polarized light is not incident on the liquid crystal panel 811*b*. Therefore, the influence of the return light on the blue light liquid crystal light valve 811 can be prevented.

Incidentally, in this embodiment, it is conceivable that the p-polarized red light emitted from the red light liquid crystal light valve 803 and reflected by the red reflecting film 831 may be reflected toward the red light liquid crystal light valve 803 without being transmitted by the blue reflecting film 831 to generate red return light, and the p-polarized green light emitted from the green light liquid crystal light valve 805 may be reflected toward the green light liquid crystal light valve 805 without being transmitted by the red reflecting film 831 and the blue reflecting film 833 to generate green return light.

In this embodiment, however, only blue return light is prevented. This is because the influence of the blue light is most significant when liquid crystal light valves using a polysilicon TFT (polysilicon TFT liquid crystal panel) as a pixel switching element is employed in the liquid crystal light valves 803, 805, 811 of the present invention.

Here, a description will be given of the principle of an occurrence of an incorrect operation in the liquid crystal light valve comprising a polysilicon TFT liquid crystal panel.

Figure 7:
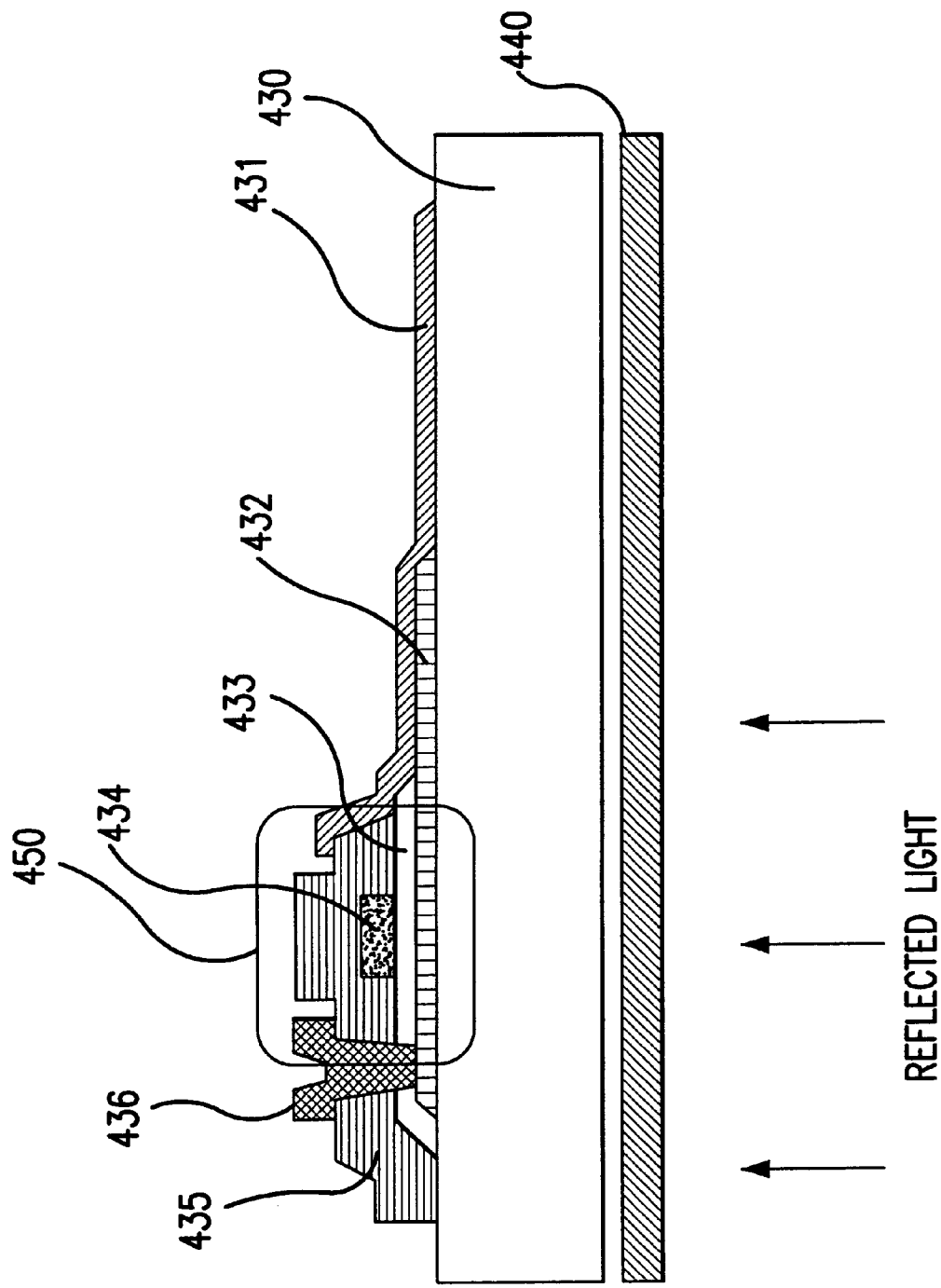
FIG. 7 is a view illustrating an example of a polysilicon TFT liquid crystal panel.

The liquid crystal panel has a construction such that liquld crystal is sandwiched between a pair of substrates. As is commonly known, in the case of the polysilicon TFT liquid crystal panel, polysilicon TFT is provided as a pixel switching element on one of the two substrates, and a counter electrode is formed on the other substrate. FIG. 7 is a view illustrating an example of the polysilicon TFT liquid crystal panel, in which a part of a substrate 430 of two substrates in the polysilicon TFT liquid crystal panel on the side where the polysilicon TFT is provided, and a part of a polarizer 440 provided outside the polysilicon TFT panel are shown in cross section. A polysilicon TFT 450 is composed of an active layer 432 consisting of polysilicon formed on the substrate 430, and a gate 434 consisting of polysilicon and so forth formed thereon sandwiching a gate insulating layer 433 therebetween. A source electrode 436 for feeding ON- and OFF-signals to the polysilicon TFT 450 is connected to the active layer 432 through a hole formed in a part of an interlayer insulation film 435. A pixel electrode 431 is also connected to the active layer 432. The information about image modulation is written by turning on the polysilicon TFT 450, and by applying voltage to the liquid crystal sandwiched between the pixel electrode 431 and the counter electrode. After completion of writing, the polysilicon TFT 450 is turned off to keep the written information until the next information is written.

However, since the polysilicon TFT liquid crystal panel is arranged so that the side of the substrate 430 on which the polysilicon TFT is formed becomes the side of the cross-dichroic prism, the reflected light from the cross-dichroic prism (return light) illuminates the polysilicon TFT liquid crystal panel from the direction indicated by arrows in the drawing. When the reflected light reaches the active layer 432, a carrier due to light excitation is generated in the active layer 405, and a current (so-called optical leakage current) is produced although the polysilicon TFT 450 is turned off. As a result, the voltage applied to liquid crystal is changed, so that the state of image modulation is disturbed.

The foregoing is the principle of occurrence of an incorrect operation of the polysilicon TFT liquid crystal light valve.

Incidentally, the optical leakage current tends to be produced when light of short wavelength is illuminated, and tends to be produced when light of high intensity (spectral) is illuminated.

That is, according to the former tendency, when the polysilicon TFT liquid crystal light valve is employed as the liquid crystal light valves 803, 805, 811, the incorrect operation of the light valve is most susceptible to the blue return light, and is relatively insusceptible to the red return light. In this embodiment, the $\lambda/4$ phase plate 821 as the polarization axis adjustment means is placed only between the blue light liquid crystal light valve 811 and the cross-dichroic prism 813 on the basis of such a tendency.

In addition, according to the latter tendency, of three color lights of red, blue and green, the incorrect operation of the light valve is susceptible to the color light of relatively high intensity (spectral). Depending on the type of the light source 101 shown in FIG. 1, the intensity of the color light of a specific color may be higher than the intensity of light of other colors. For example, in general, in the case of a metal halide lamp, the intensity of green light is relatively higher than the intensity of red and blue light. Therefore, in such a case, it is preferable to provide the polarization axis adjustment means between the liquid crystal light valve 805 for green light and the cross-dichroic prism 813.

B. Second Embodiment

Figure 8:
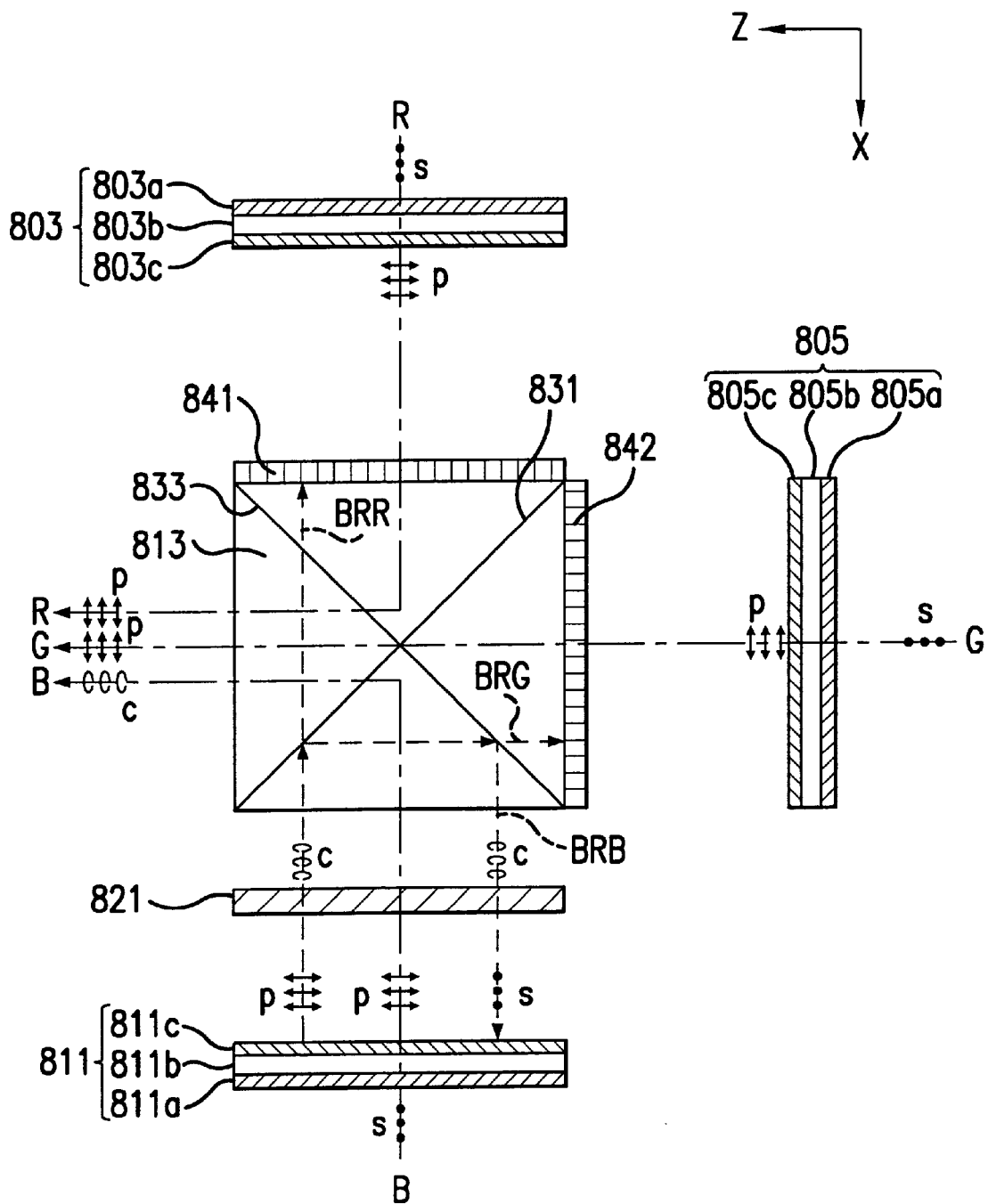
FIG. 8 illustrates the concept of the main part of a second embodiment.

FIG. 8 illustrates the concept of the main part of a second embodiment. The second embodiment is such that in addition to the first embodiment shown in FIG. 5, blue light absorbing filters 841, 842 are provided on the red light and green light incident surfaces of the cross-dichroic prism 813 so as to prevent unnecessary emergence of blue light from the cross-dichroic prism 813 to the red light Liquid crystal light valve 803 and to the green light liquid crystal light valve 805. The basic operation for projecting an image is exactly the same as the first embodiment. Incidentally, in this embodiment, polarized light having a polarization axis in the direction perpendicular to the plane of the drawing is referred to as the s-polarized light, and polarized light having a polarization axis in the direction parallel to the plane of the drawing is referred to as the p-polarized light.

Of the circularly polarized blue light emitted from the $\lambda/4$ phase plate 821 to be incident on the cross-dichroic prism 813, unnecessary transmitted light BRR transmitted by the red reflecting film 831 and by the blue reflecting film 833, and unnecessary reflected light BRG reflected from the red reflecting film 831 and transmitted by the blue reflecting film 833 may be generated. The circularly polarized light is synthesized light of the s-polarized light and the p-polarized light, and when such transmitted light BRR and the reflected light BRG are illuminated without change on the emitting side of the surfaces of the red light liquid crystal light valve 803 and the green light liquid crystal light valve 805, they are incident on the liquid crystal panels 803b, 805b, passing through the p-polarized transmitting polarizing plates 803c, 805c, and an incorrect modulation of light is performed, so that an incorrect image may be displayed. The blue light absorbing filters 841, 842 absorb such transmitted light BRR and reflected light BRG to prevent illumination on the liquid crystal light valves 803, 805.

In the second embodiment, not only the incidence of unnecessary reflected light BRB on the blue light liquid crystal light valve 811 is prevented, but also unnecessary transmitted light BRR and the reflected light BRG, which may illuminate the red light liquid crystal light valve 803 and the green light liquid crystal light valve 805, are absorbed by the blue light absorbing filters 841, 842 to prevent the incorrect operation of the projection display device.

C. Third Embodiment

Figure 9:
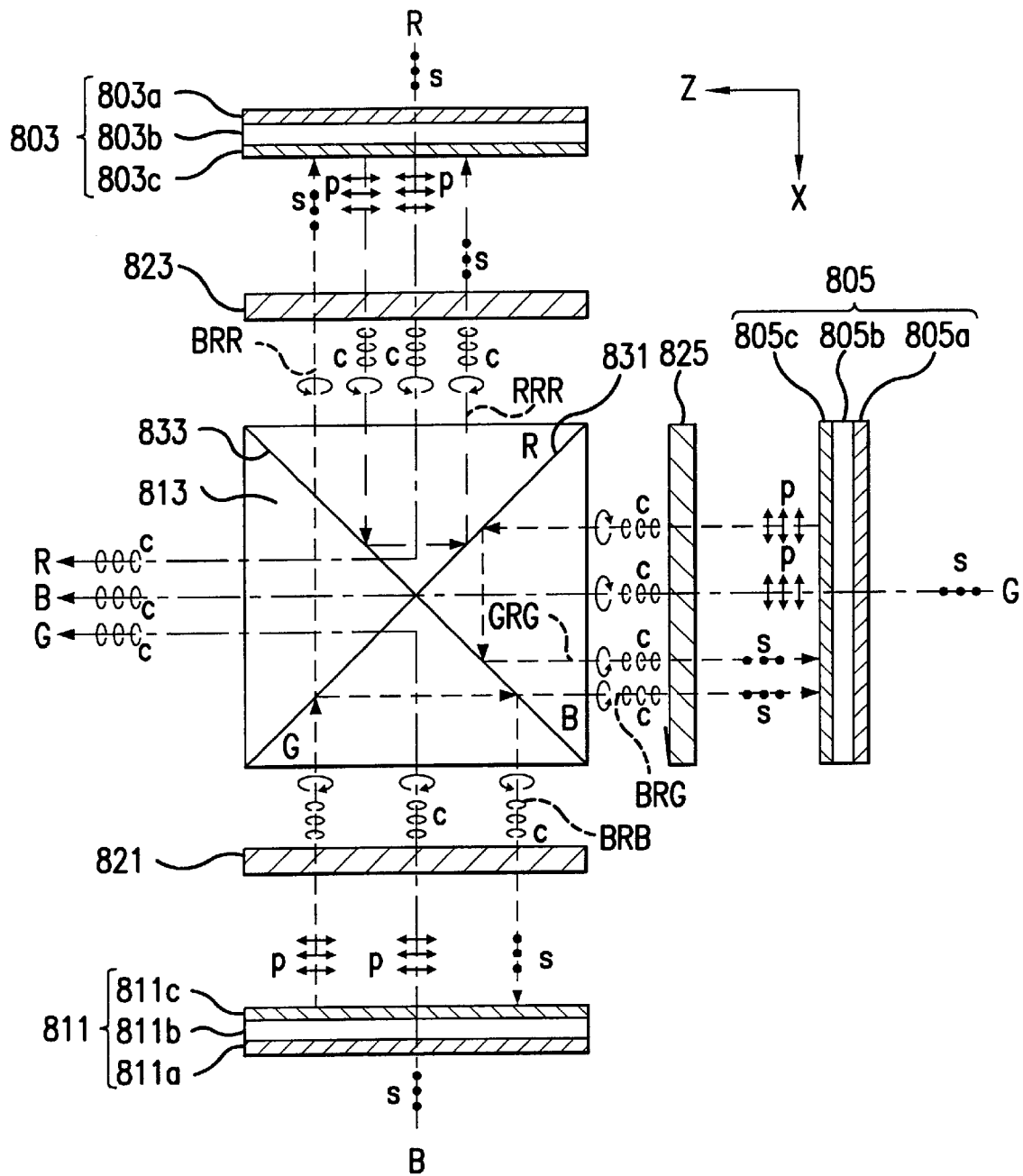
FIG. 9 illustrates the concept of the main part of a third embodiment.

FIG. 9 illustrates the concept of the main part of a third embodiment. The third embodiment is such that in addition to the first embodiment shown in FIG. 5, the $\lambda/4$ phase plates 823, 825 are further placed in the optical paths between the red light liquid crystal light valve 803 and the cross-dichroic prism 813, and between the green light liquid crystal light valve 805 and the cross-dichroic prism 813. Other components are the same as those of the first embodiment. The p-polarized red light modulated by the red light liquid crystal light valve 803 to be emitted, and the p-polarized green light modulated by the green light liquid crystal light valve 805 to be emitted are converted into circularly polarized light by the $\lambda/4$ phase plates 823, 825 and are incident on the cross-dichroic prism 813, similarly to the blue light in the first embodiment. However, the basic operation for projecting an image is the same as that of the first embodiment.

In, the circularly polarized red light incident on the cross-dichroic prism 813, return light RRR reflected without being transmitted by the blue reflecting film 833, and incident again on the λ/4 phase plate 823 is generated. Such return light is, similarly to the case shown in FIG. 6, converted into s-polarized light to be emitted, and illuminates the side of the emitting surface of the red light liquid crystal light valve 803. However, since the p-polarized transmitting polarizing plate 803c, which does not transmit the s-polarized light is provided on the side of the emitting surface of the red light liquid crystal light valve 803, the return light RRR converted into s-polarized light is not incident on the liquid crystal panel 803b. Therefore, the influence of the red return light on the red light liquid crystal light valve 803 can be prevented. At this time, the optical axis of the λ/4 phase plate 823 may be preferably set so that the emergent light thereof is converted into s-polarized light, when, of the circularly polarized blue light incident on the cross-dichroic prism 813, the transmitted light BRR transmitted by both of the blue reflecting film 833 and the red reflecting film 831 is incident on the λ/4 phase plate 823, as shown in FIG. 9.

This prevents the unnecessary blue reflected light BRR illuminated on the red light liquid crystal light valve 803 from being incident on the liquid crystal panel 803b. Therefore, the influence of the unnecessary blue transmitted light on the red light liquid crystal light valve 303 can be prevented.

In addition, in regard to the green light emitted from the green light liquid crystal light valve 805, return light CRG reflected toward the green light liquid crystal light valve 805 without being transmitted by the red reflecting film 831 and the blue reflecting film 833 is generated. Such return light is also illuminated on the emitting side surface of the green light liquid crystal light valve 805 after being converted into s-polarized light, similarly to the above-described return light RRR, BRB. However, since the p-polarized transmitting polarizing plate 805c, which does not transmit the s-polarized light, is provided on the emitting side surface of the green light liquid crystal light valve 805, the return light is not incident on the liquid crystal panel 805b. Therefore, the influence of the unnecessary green reflected light on the green light liquid crystal light valve 805 can be also prevented. At this time, similarly to the above-described λ/4 phase plate 823, the optical axis of the λ/4 phase plate 825 may be preferably set so that of the circularly polarized blue light incident on the cross-dichroic prism 813, the reflected light BRG reflected from the red reflecting film 831 and transmitted by the blue reflecting film 833 is converted into s-polarized light when it is incident on the λ/4 phase plate 825. This prevents the unnecessary blue reflected light BRG illuminated on the green light liquid crystal light valve 805 from being incident on the liquid crystal panel 305b. Therefore, the influence of the unnecessary blue reflected light on the green liquid crystal light valve 805 can be also prevented.

In the third embodiment, the λ/4 phase plates 823, 825, 821 are placed between the red light liquid crystal light valve 803, the green light liquid crystal light valve 805, the blue light liquid crystal light valve 811 and the cross-dichroic prism 813, respectively, whereby not only the red, green and blue return light generated in the cross-dichroic prism 813 is prevented from being incident on the liquid crystal light valves 803, 805, 811 of the corresponding color and affecting them, but also the unnecessary reflected light is prevented from being incident on other liquid crystal light valves 803, 811 and affecting them.

In addition, in the third embodiment, since all the emergent light emitted from the cross-dichroic prism 813 to the projection lens 814 (FIG. 1) is circularly polarized light, not only a normal screen, but also a polarizing screen can be used as the screen 815 for projecting the projected image thereon.

D. Fourth Embodiment

Figure 10:
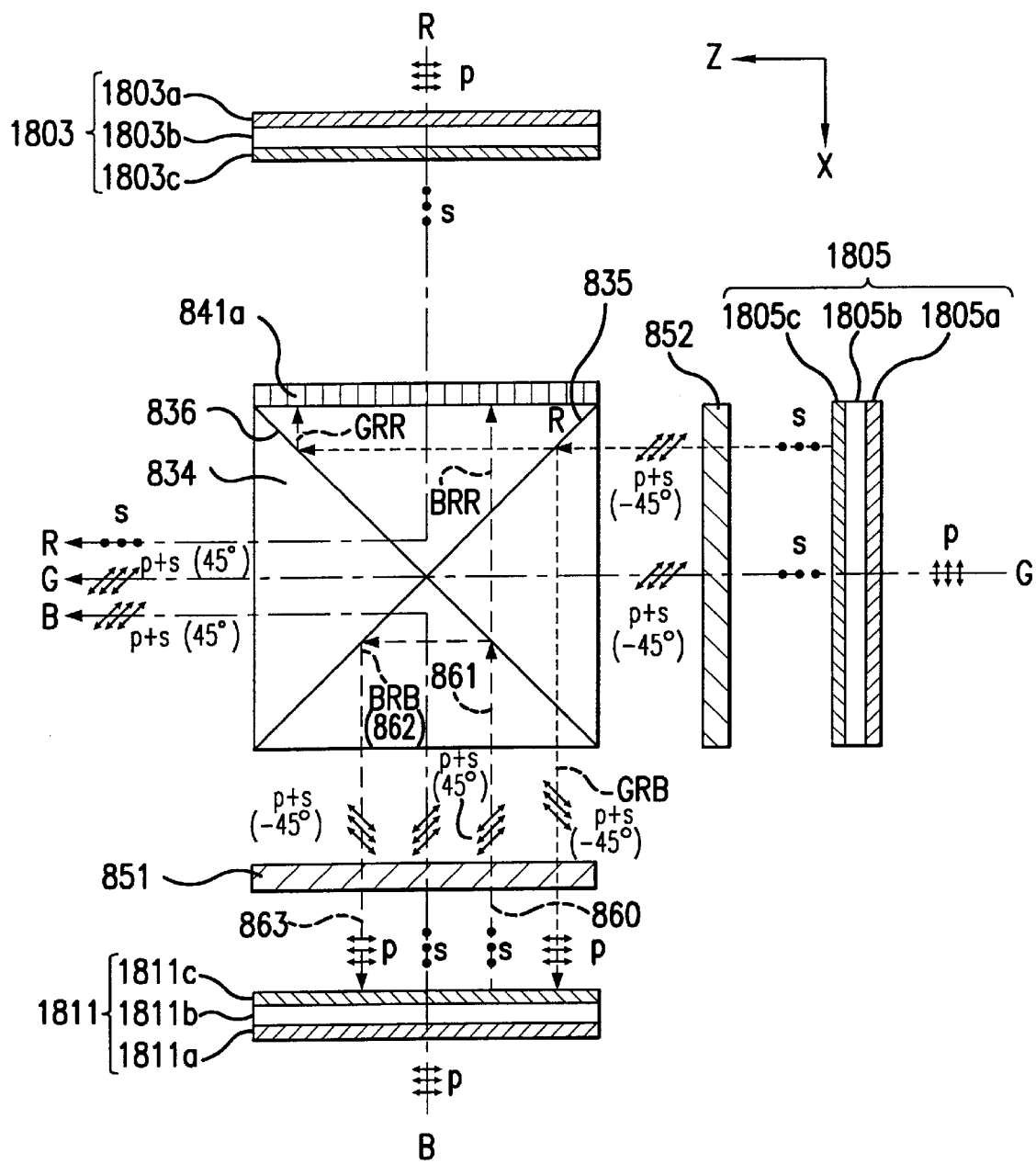
FIG. 10 illustrates the concept of the main part of a fourth embodiment.

FIG. 10 illustrates the concept of the main part of a fourth embodiment. The fourth embodiment is constituted such that a λ/2 phase plate 851 is placed in the optical path between a blue light liquid crystal light valve 1811 and a cross-dichroic prism 834, and a λ/2 phase plate 852 is placed in the optical path between a green light liquid crystal light valve 1805 and the cross-dichroic prism 834.

The λ/2 phase plates 851, 852 function as the polarization axis adjustment means. In addition, a blue-and-green-light-absorbing filter 841a is provided on the red light incident surface of the cross-dichroic prism 834. In addition, in three liquid crystal light valves 1803, 1805, 1811, p-polarized transmitting polarizing plates are used as polarizers 1803a, 1805a, 1811a on the incident side surfaces of liquid crystal panels 1803b, 1805b, 1811b, and s-polarized transmitting polarizing plates are used as polarizers 1803c, 1805c, 1811c on the emitting side of the surfaces. Therefore, in the first embodiment, it is necessary to convert the polarized light emitted from the polarizing beam splitter array 320 into p-polarized light. This is made possible by moving the λ/2 phase plates shown in FIGS. 2 and 4 to the emitting surfaces of the s-polarized light reflected by the reflecting films 332.

Here, the optical axis of the λ/2 phase plate 851 is placed in the direction to be inclined 22.5 degrees in a clockwise direction with respect to the polarization axis of the s-polarized light passing through the s-polarized light transmitting polarizer 1811c. In addition, in order to reduce a decrease in quantity of the blue light as described later, it is assumed that the wavelength of the λ/2 phase plate 851 is set to the wavelength in which a blue spectrum shows a peak. At this time, of the s-polarized blue light passing through the s-polarized transmitting polarizing plate 1811c, the return light BRB passing through the λ/2 phase plate 851 and reflected from the blue reflecting film 836 and the red reflecting film 835 of the cross-dichroic prism 834 is incident on the λ/2 phase plate 851 again, and is converted into p-polarized light to illuminate the blue light liquid crystal light valve 1811.

Figure 11:
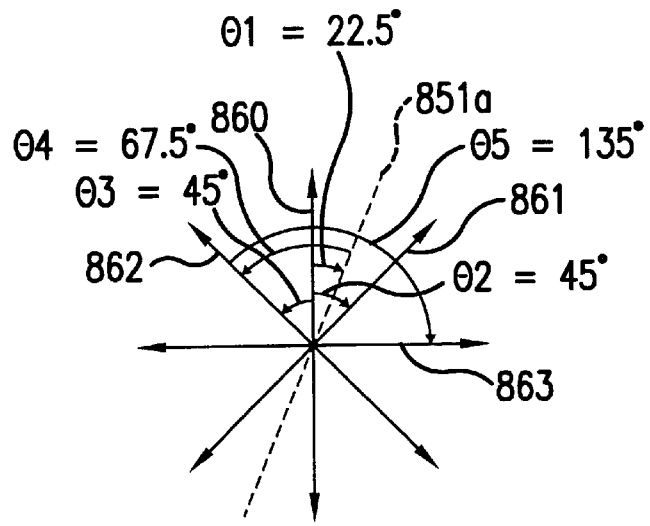
FIG. 11 is an illustration for explaining the change of the polarization axis of polarized light passing through a $\lambda/2$ phase plate.

FIG. 11 is a view for explaining this state. As described previously, the λ/2 phase plate 851 is placed so that its optical axis 851a has an angle of 22.5 degrees in a clockwise direction with respect to s-polarized light 860 (this angle is taken as θ1). When the s-polarized light 860 passes through the λ/2 phase plate 851, it becomes polarized light 861 having the inclination θ2 which is double the inclination θ1, i.e., the inclination rotated by 45 degrees in a clockwise direction. A part of the polarized light 861 becomes return light BRB (polarized light 862) which is reflected from the blue reflecting film 836 and the red reflecting film 835 of the cross-dichroic prism 834 and is incident on the λ/2 phase plate 851 again. The polarization axis of the polarized light 862 is the polarization axis symmetrical about a direction perpendicular to the plane of the drawing, i.e., the polarization axis having the inclination θ3 rotated by 45 degrees in a counterclockwise direction with respect to the s-polarized light 860. When the polarized light 862 passes through the λ/2 phase plate 851, it becomes polarized light 863 having the inclination θ5 which is double the angle θ4 formed between the polarized light 862 and the optical axis 851a, i.e., the inclination rotated by 135 degrees in a clockwise direction. The polarized light 863 is the polarized light in the direction perpendicular to the s-polarized light 860, i.e., the p-polarized light. That is, the return light BRB is converted into p-polarized light by the λ/2 phase plate 851 and illuminated on the blue light liquid crystal light valve 1811. However, since the s-polarized transmitting polarizing plate 1811c, which does not transmit the p-polarized light, is provided on the emitting side surface of the blue light liquid crystal light valve 1811, the return light BRB changed to p-polarized light is absorbed by the s-polarized transmitting polarizing plate 1811c, and is not incident on the Liquid crystal panel 1811b. Therefore, the influence of the return light on the blue light liquid crystal light valve 1811 can be prevented.

Figure 12:
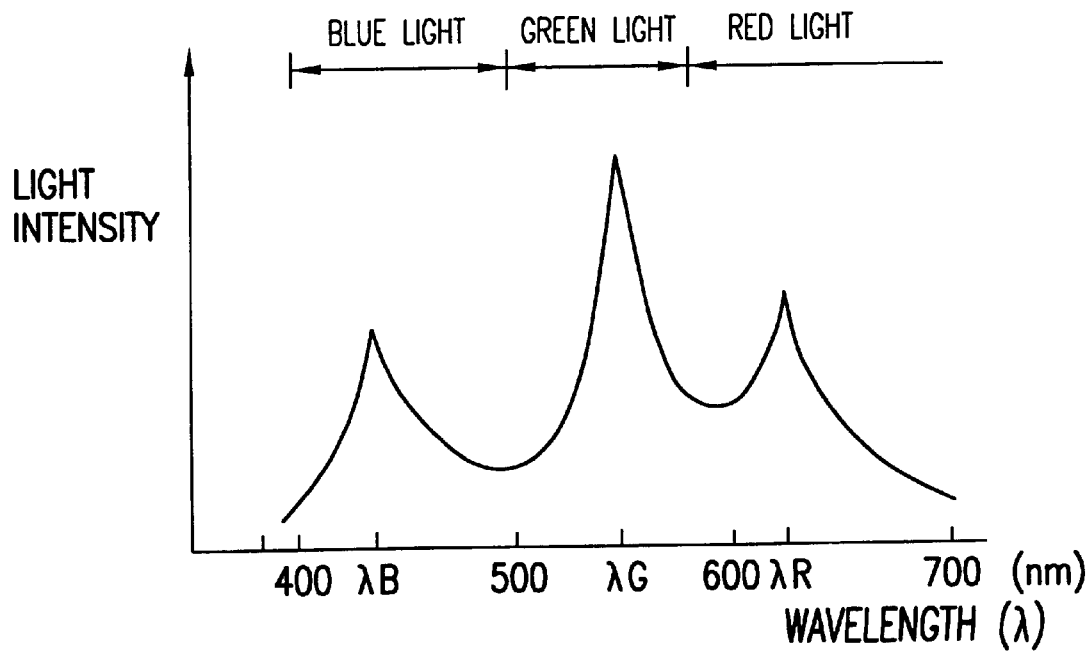
FIG. 12 is a graph showing an example of spectral distribution characteristics of a high-pressure discharge lamp used for a light source lamp 101.

FIG. 12 is a graph showing an example of spectral distribution characteristics of a high-pressure discharge lamp used for the light source lamp 101 shown in FIG. 2. As such high pressure lamps, for example, a halogen lamp, a metal halide lamp and so forth can be mentioned. As shown in the drawing, a spectrum of each color has a wavelength showing a peak. For example, the peaks are shown at λB, λG, and λR in the blue light, the green light and the red light, respectively. Therefore, the wavelength of the above-described λ/2 phase plate 851 may be preferably set to the above wavelength λB in order to transmit the blue light most effectively and to reduce the decrease in quantity of light.

Figure 13:
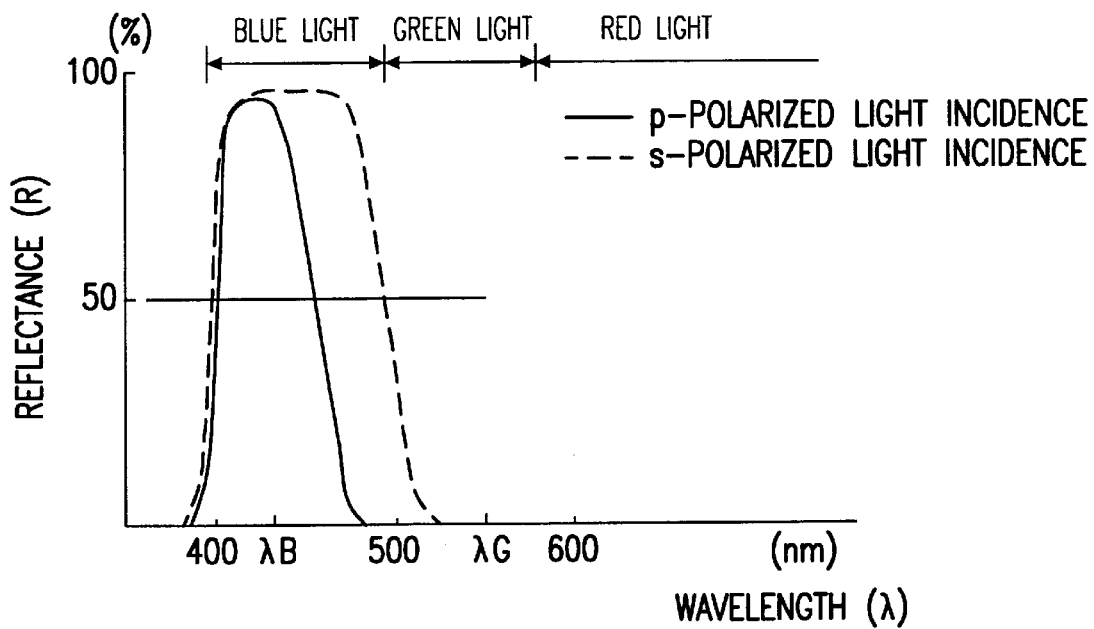
FIG. 13 is a graph showing examples of the spectral reflectance of a blue reflecting film 836.

The polarized light 861 inclined 45 degrees in a clockwise direction with respect to the s-polarized light (blue light) 860 is, as described above, incident on the blue reflecting film 836 of the cross-dichroic prism 834. This is due to the fact that an equal amount of p-polarized light and s-polarized light is incident. Therefore, in order to reflect efficiently the blue light incident on the cross-dichroic prism 834, it is necessary that both of the p-polarized blue light and the s-polarized blue light are effectively reflected from the blue reflecting film 836. FIG. 13 is a graph showing examples of spectral reflectance of blue reflecting film 836. In FIG. 13, the reflectance characteristics with respect to the s-polarized light are drawn by a broken line, and the reflectance characteristics with respect to the p-polarized light are drawn by a solid line. Incidentally, a case where the reflectance is 50% or more is regarded as an effective reflection. The s-polarized light shows effective reflection characteristics in a blue area of 400 to 500 nm. On the other hand, the p-polarized light can only be effectively reflected within a range narrower than that of the s-polarized light. Thus, in order to realize the most efficient reflection of the blue light, in the blue reflecting film 836, the reflectance of the p-polarized light is increased as high as possible, and the center of the reflection area is set to the wavelength λB showing the peak of the blue spectrum of the above-described lamp. This can effectively utilize blue light of the lamp, and realize a projection display device of beautiful color.

Figure 14:
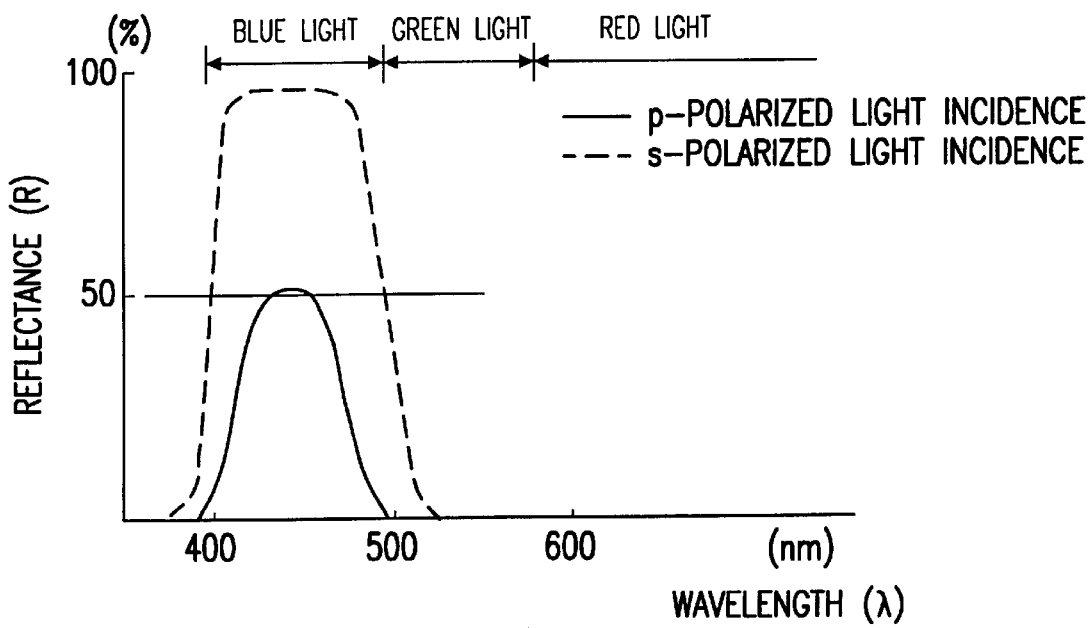
FIG. 14 is a graph showing examples of the spectral reflectance of a conventional blue reflecting film.

Incidentally, examples of spectral reflectance of a conventional blue reflecting film are shown in FIG. 14. This reflecting film cannot reflect sufficiently the p-polarized light component, and a picture which is lacking in blue color is obtained.

The above-described cross-dichroic prism 834 having the blue reflecting film 836 is commonly composed of a dielectric multilayer film, and the characteristics thereof can be adjusted by changing dielectric materials constituting the multilayer film and by changing the number of layers of the multilayer film. In addition, in the first, second and third embodiments, the cross-dichroic prism 834 including the reflecting film best suited for characteristics of incident light may be preferably used.

A description will be given returning to FIG. 10 again. The red reflecting film 835 has characteristics for reflecting green light to some extent. Therefore, the reflected light GRB reflected from the red reflecting film 835 is incident on the blue light liquid crystal light valve 1811, whereby an incorrect operation may occur. Thus, in this embodiment, the λ/2 phase plate 852 is also placed between the green light liquid crystal light valve 1805 and the cross-dichroic prism 834. The optical axis of the λ/2 phase plate 852 is placed to be inclined 22.5 degrees in a counterclockwise direction with respect to the polarization axis of the s-polarized light emitted from the green light liquid crystal light valve 1805. Therefore, of the s-polarized light emitted from the green light liquid crystal light valve 1805, the reflected light GRB reflected from the red reflecting film 835 is converted into p-polarized light when passing through the λ/2 phase plate 351. However, as described previously, since the s-polarized transmitting polarizing plate 1811c is provided on the emitting side surface of the blue light liquid crystal light valve 1811, the p-polarized light is absorbed by the s-polarized transmitting polarizing plate 1811c, and is not incident on the liquid crystal panel 1811b. Therefore, the influence of the unnecessary green reflected light on the blue light liquid crystal light valve 1811 can be prevented.

Incidentally, in this embodiment, a case is assumed where the influence of the red light emitted from the red light liquid crystal light valve 1803 on the liquid crystal light valves 1803, 1805, 1811 presents almost no problem. Therefore, as shown in FIG. 8, the λ/2 phase plate is not placed in the optical path between the red light liquid crystal light valve 1803 and the cross-dichroic prism 834. When an incorrect operation due to the red light is a problem, however, the λ/2 phase plate can be placed there to avoid the problem.

In this embodiment, instead of providing the λ/2 phase plate between the red light liquid crystal light valve 1803 and the cross-dichroic prism 834, a blue-and-green-light-absorbing filter 841a is provided on the red light incident surface of the cross-dichroic prism 834. The blue-and-green-light-absorbing filter 841a absorbs the transmitted light BRR transmitted by the blue reflecting film 836 and the red reflecting film 835 within the cross-dichroic prism 834, and the reflected light GRR transmitted by the red reflecting film 835 and reflected from the blue reflecting film so as to prevent the incidence on the red light Liquid crystal light valve 1803.

Incidentally, in this embodiment, a description is given taking as an example a case where the optical axis of the λ/2 phase plate is adjusted so that the s-polarized light incident on the λ/2 phase plate is converted into linearly polarized light whose polarization axis is inclined 45 degrees with respect to a line of intersection of the blue reflecting film 836 and the red reflecting film 835 of the cross-dichroic prism 834. However, the adjustment is not limited thereto. That is, the adjustment may be effected so that linearly polarized light can be obtained in which the polarization axis of the emitted light from the λ/2 phase plate has a predetermined inclination with respect to the line of intersection of the blue reflecting film 836 and the red reflecting film 835 of the cross-dichroic prism 834. This allows the return light incident on the cross-dichroic prism 834, and reflected from the blue reflecting film 835 and the red reflecting film 336 to become linearly polarized light having a polarization axis inclination different from that of the emitted light from the λ/2 phase plate. After passing through the λ/2 phase plate, this return light becomes linearly polarized light having a polarization axis inclination different from that of the linearly polarized light (s-polarized light or p-polarized light)

emitted from the liquid crystal light valves, i.e., the polarization axis inclined with respect to the polarization axis of the s-polarized light and to the polarization axis of the p-polarized light. Although the linearly polarized light having the inclined polarization axis is synthesized light of p-polarized light and s-polarized light, and includes both polarized light, the quantities thereof can be reduced as compared with a case where all the return light is polarized light having the same polarization axes as that of the emitted light from the liquid crystal light valves. This can suppress an incorrect operation in the liquid crystal panels.

Particularly, the inclination of the polarization axis of the emitted light from the λ/2 phase plate may be set within the range of about 10 degrees to about 45 degrees with respect to the line of intersection of the blue reflecting film 836 and the red reflecting film 835 of the cross-dichroic prism 834. However, the range of 45 degrees to 90 degrees of the inclination of the polarization axis with respect to the line of intersection is equivalent to the range of 45 degrees to 0 degrees, and the above range of about 10 degrees to about 45 degrees is equivalent to the range of about 80 degrees to about 45 degrees. This can reduce a polarization component in the polarization components of the return light (polarized light causing an incorrect operation) which is the same as that of the emitted light from the liquid crystal light valves in response to the magnitude of the inclination. Incidentally, if the inclination of the polarization axis of the emitted light from the λ/2 phase plate is set to about 10 degrees or more, the polarized light causing the incorrect operation can be reduced by about 10% or more. Further, if the above inclination range is set within the range of about 22.5 degrees to 45 degrees, the ratio of the polarized light causing the incorrect operation in the polarization component of the return light can be reduced to about 50% or less, which is more effective. In addition, as described above, if the polarization axis of the emitted light from the λ/2 phase plate is inclined about 45 degrees with respect to the line of intersection of the blue reflecting film 836 and the red reflecting film 835 of the cross-dichroic prism 834, the polarization component equal to that of the emitted light from the liquid crystal light valves can be substantially eliminated.

Further, although the λ/2 phase plate is used as the polarization axis adjustment means in the above embodiment, the means is not limited thereto, and means may be employed as long as it can provide linearly polarized light in which the polarization axis of the emitted light from the polarization axis adjustment means has a predetermined inclination with respect to the line of intersection of the blue reflecting film 836 and the red reflecting film 835 of the cross-dichroic prism 834.

E. Fifth Embodiment

Figure 15:
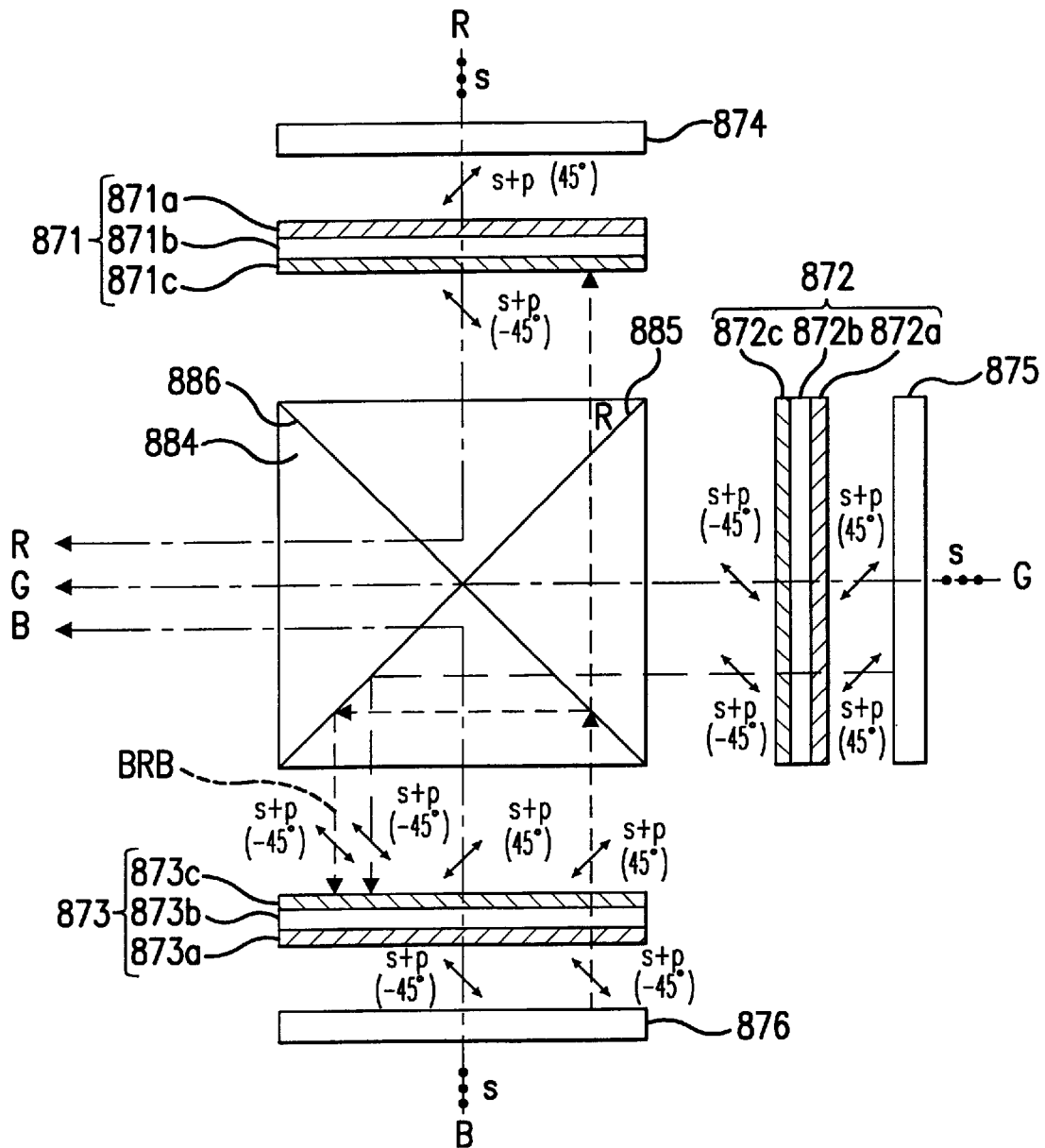
FIG. 15 illustrates the concept of the main part of a fifth embodiment.

FIG. 15 illustrates the concept of the main part of a fifth embodiment. In this embodiment, the λ/2 phase plates 874, 875, 876 are placed on the side of the incident surfacers of three liquid crystal light valves 871, 872, 873. The basic operation for projecting an image is the same as that of the above described embodiments. Similarly to the first embodiment shown in FIG. 1, the luminous flux emitted from the light source 10 is converted into one kind of linearly polarized light of almost uniform polarization directions by the polarized light generator 20, and further, becomes s-polarized light split into each color. Then, each of the luminous flux split into colors red, green and blue are incident on the λ/2 phase plates 874, 875, 876 shown in FIG. 15. The optical axes of the λ/2 phase plates 874, 875, 876 are placed so as to be inclined 22.5 degrees with respect to the s-polarized light. Therefore, the light emitted from the λ/2 phase plates 874, 875, 876 becomes linearly polarized light whose polarization axis is rotated 45 degrees in a clockwise direction.

Figure 16:
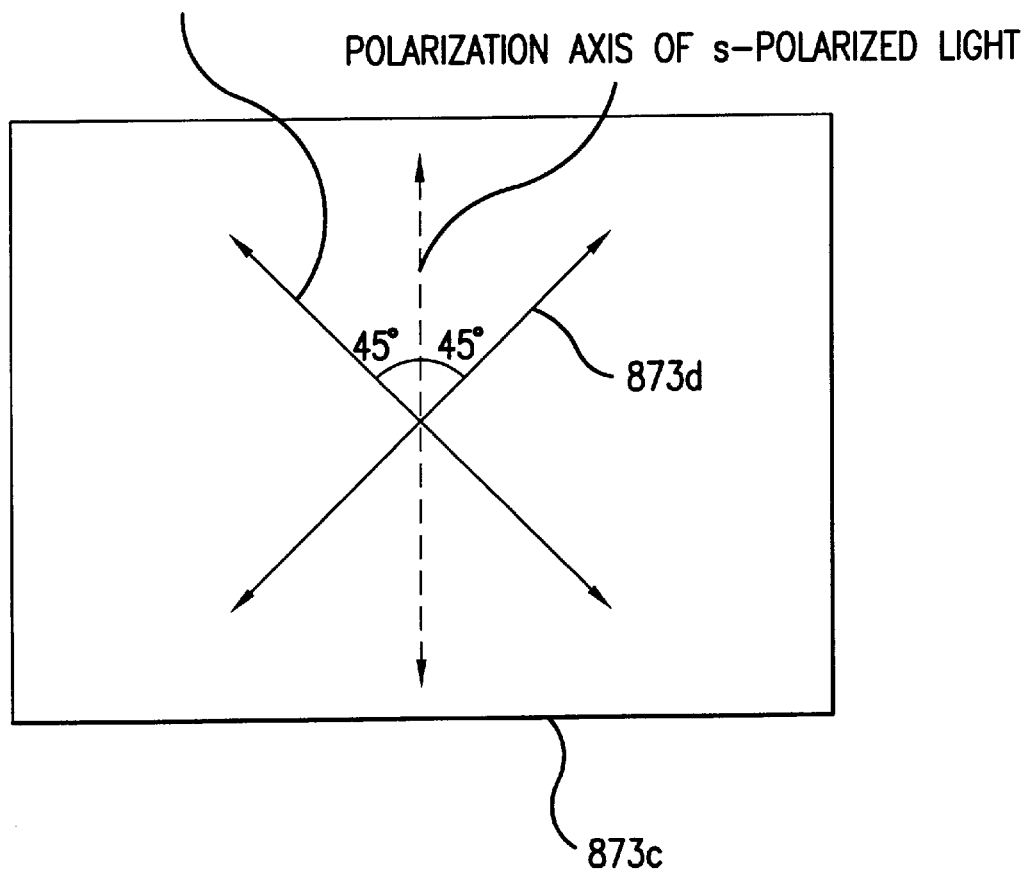
FIG. 16 is an illustration showing a polarization light axis 873d of a polarizer 873c on the emitting side.
Figure 17:
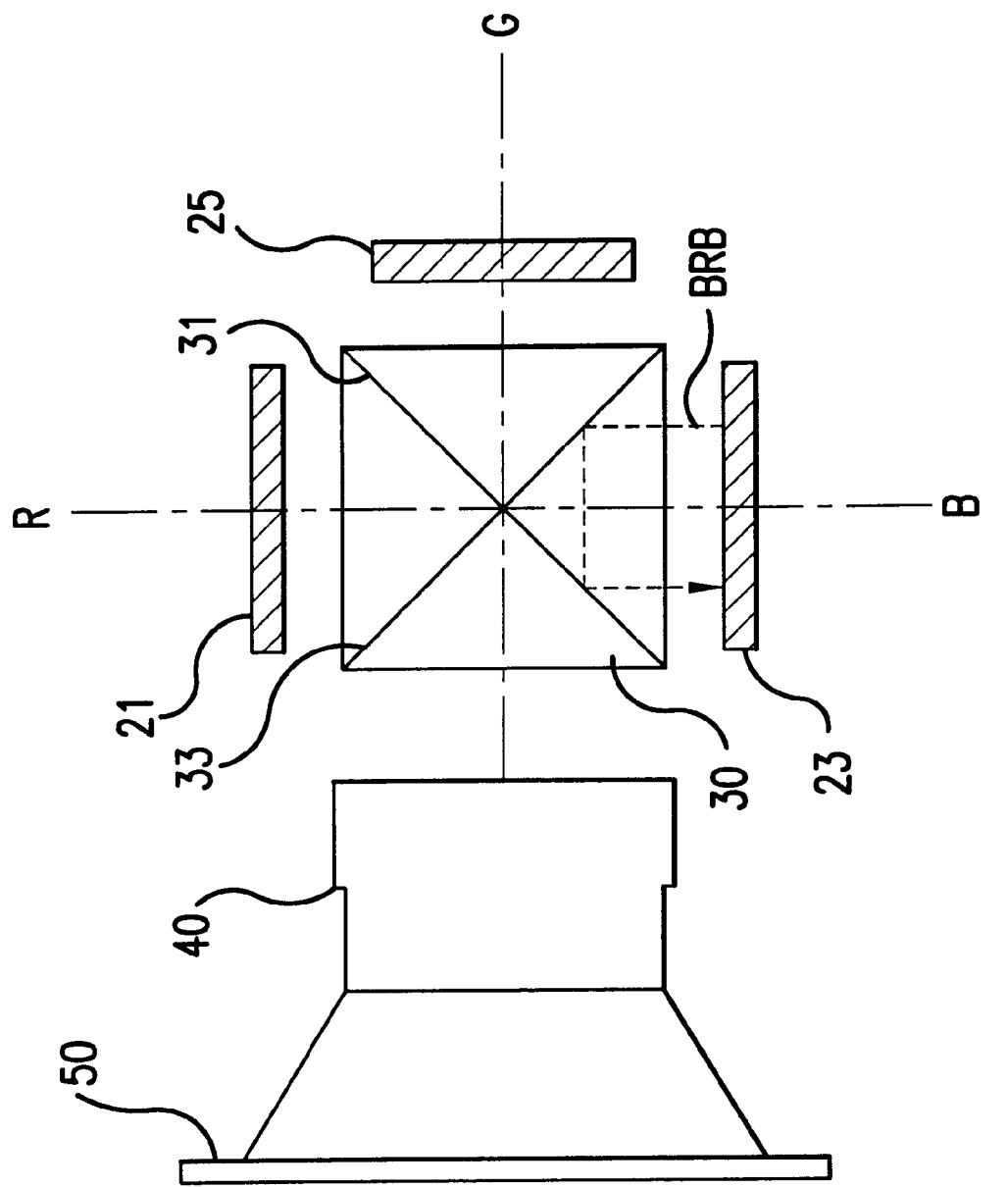
FIG. 17 schematically illustrates the construction of the main part of a conventional projection display device.

Polarizing plates 871a, 872a, 873a on the incident side of the three liquid crystal light valves 871, 872 and 873, respectively, are placed so that the transmission axes thereof coincide with the polarization direction of the incident light beam. In other words, these polarizers 871a, 872a, 873a on the incident side merely increase the purity of the linearly polarized light component similarly to the polarizers 803a, 805a, 811a, and they can be omitted. Liquid crystal panels 871b, 872b, 873b are panels using a twisted nematic liquid crystal twisted at 90 degrees, and polarizers 871c, 872c, 873c thereof are placed so that the transmission axes thereof are perpendicular to the transmission axes of the polarizers 871a, 872a, 873a on the incident side. Therefore, as one example shown in FIG. 16, from polarizers 871c, 872c, 873c on the emitting side, linearly polarized light is emitted which is inclined 45 degrees with respect to the s-polarized light in the direction opposite to the optical axes of the λ/2 phase plates 874, 875, 876.

Here, a subsequent action will be described taking the blue light as an example. The linearly polarized light emitted from the polarizer 873c on the emitting side is linearly polarized light 873d in which an equal amount of the s-polarized light component and p-polarized light component is synthesized. The linearly polarized light 873d is incident on a cross-dichroic prism 884, almost entirely reflected from a blue reflecting film 886 and then, transmitted by a red reflecting film 885. Here, although it is in small quantity, return light BRB which is reflected from the red reflecting film 835 and returns to the blue light liquid crystal light valve 873 is generated. However, this reflected light BRB is linearly polarized light in the direction perpendicular to the transmission axis of the polarizer 873c, and is entirely absorbed by the polarizer 873c. Therefore, the return light BRB is not incident on the liquid crystal panel 873b, so that an incorrect operation can be prevented. Return light of other colors can be prevented similarly. Incidentally, as the cross-dichroic prism 884, the cross-dichroic prism 813 of the third embodiment can be used.

In addition, in the linearly polarized light emitted from the polarizer 873c, transmitted light (transmitted light BTR) which is transmitted straight by the cross-dichroic prism 884 to be incident on the polarizer 871c of the red light liquid crystal light valve 871 is included. However, as is apparent form FIG. 15, since the polarizer 871c is placed so that the transmission axis thereof is perpendicular to the transmission axis of the polarizer 873c, the transmitted light BTR is absorbed by the polarizer 871c. Therefore, the transmitted light BTR is not incident on the liquid crystal panel 871b, and the incorrect operation caused thereby can be prevented.

Further, as is apparent from FIG. 15, since the polarizer 872c on the emitting side of the green light liquid crystal light valve 872 is placed so that the transmission axis thereof is perpendicular to the transmission axis of the blue polarizer 873c, the incorrect operation of the blue light liquid crystal light valve 873 due to the influence of the green light can be prevented.

Incidentally, in this embodiment, a description is given taking as an example a case where the optical axis of the λ/2 phase plate is adjusted so that the s-polarized light incident on the λ/2 phase plate is converted into linearly polarized light in which the polarization axis thereof is inclined 45 degrees with respect to the line of intersection of the blue reflecting film 836 and the red reflecting film 835 of the cross-dichroic prism 834. However, the adjustment is not limited thereto. The adjustment may be effected so that linearly polarized light can be obtained in which the polarization axis of the emitted light from the λ/2 phase plate has a predetermined inclination with respect to the line of intersection of the blue reflecting film 836 and the red reflecting film 835, and a polarizer may be provided so that the polarization axis of the linearly polarized light emitted from the polarizer on the emitting side of the liquid crystal light valve has a predetermined angle with respect to the line of intersection of the blue reflecting film 836 and the red reflecting film 835. This allows the return light incident on the cross-dichroic prism 834 and reflected from the blue reflecting film 836 and the red reflecting film 835 to become linearly polarized light having a polarization axis inclination different from that of the emitted light from the polarizer on the emitting side of the liquid crystal light valve. When the inclination of the polarization axis of the emitted light from the λ/2 phase plate is not substantially 45 degrees, the inclination of the polarization axis of the return light is different from that of the absorption axis of the polarizer on the emitting side of the liquid crystal light valve, so that the return light cannot be completely absorbed. However, the quantity thereof can be reduced as compared with a case where all the return light is polarized light having a polarization axis in the same direction as that of the transmission axis of the polarizer on the emitting side of the liquid crystal light valve. This can suppress the incorrect operation in the liquid crystal panels.

For example, the inclination of the polarization axis of the emitted light from the λ/2 phase plate may be set to any angle in the range of about 10 degrees to 45 degrees with respect to the line of intersection of the blue reflecting film 836 and the red reflecting film 835 of the cross-dichroic prism 834, and the inclination of the polarization axis of the emitted light from the polarizer on the emitting side of the liquid crystal light valve may be set substantially equal to or perpendicular to the inclination of the polarization axis of the emitted light from the λ/2 phase plate. However, the range of 45 degrees to 90 degrees of the inclination of the polarization axis with respect to the line of intersection is equivalent to the range of 45 degrees to 0 degree, and the above range of about 10 degrees to about 45 degrees is equivalent to the range of about 80 degrees to about 45 degrees. This can reduce a polarization component in the polarization components of the return light (polarized light causing an incorrect operation), which is the same as that of the emitted light from the liquid crystal light valve in response to the magnitude of the inclination. Incidentally, if the inclination of the polarization axis of the emergent light from the λ/2 phase plate is set about 10 degrees or more, the polarized light causing the incorrect operation can be reduced by about 10% or more. Further, if the above inclination range is set within the range of about 22.5 degrees to 45 degrees, the ratio of the polarized light causing the incorrect operation in the polarization components of the return light can be reduced to about 50% or less, which is more effective. In addition, as described above, if the polarization axis of the emitted light from the λ/2 phase plate is inclined about 45 degrees, the polarization component equal to that of the emitted light from the polarizer on the emitting side of the liquid crystal light valve can be substantially eliminated.

Further, although the λ/2 phase plate is used as the polarization axis adjustment means in the above embodiment, the means is not limited thereto, and means may be employed as long as it can provide linearly polarized light in which the polarization axis of the emitted light from the polarization axis adjustment means has a predetermined inclination with respect to the line of intersection of the blue reflecting film 836 and the red reflecting film 835 of the cross-dichroic prism 834.

The present invention is not limited to the above embodiments and modes for carrying out the invention, and is capable of being carried out in various forms within the spirit and scope thereof. For example, the following modifications may be performed.

(1) Although the green light is transmitted straight through by the cross-dichroic prism 813 in the above-described first to third embodiments, there is no need for the light to be limited thereto, and the red light or the blue light may be transmitted straight through.

(2) In the above-described first to third embodiments, an example of preventing an incorrect operation of the liquid crystal light valve using the λ/4 phase plate is shown. In addition, in the fourth to fifth embodiments, an example of preventing the incorrect operation of the liquid crystal light valve by the λ/2 phase plate and the polarizers included in the liquid crystal light valve is shown. Further, an example of preventing the incorrect operation by absorbing filters is shown. In addition, an example of the cross-dichroic prism is shown as color light synthesizing means. However, there is no need for the prevention of the incorrect operation to be limited thereto, and in the case of synthesizing color light using red, green and blue liquid crystal light valves, the incorrect operation may be prevented by the combination of phase plates, polarizers, and absorbing filters and so forth.

(3) In this embodiment, although a description is given laying stress on the incorrect operation of the liquid crystal light valve due to the blue light, there is no need to be limited thereto. A polarization axis adjustment means, such as a λ/2 phase plate and a λ/4 phase plate may be preferably included so as to prevent the incorrect operation in the liquid crystal light valve due to color light whose sensitivity of a modulation control element for performing modulation of light in the liquid crystal light valve is high. In addition, polarization axis adjustment means, such as a λ/2 phase plate and a λ/4 phase plate may be preferably included so as to prevent the incorrect operation due to the color light having a relatively high spectral intensity in each color light, i.e., the color light showing a relatively high peak among the spectral peaks of each color light.

(4) In the first to fifth embodiments, a description is given with each incident color light limited to linearly polarized light consisting of one polarization component (s-polarized light or p-polarized light). However, if the light having two mixed components of light is employed as the incident light, a similar action and effect can be obtained.

What is claimed is:

1. A projector, comprising:

a light source;

a color separator that separates light from said light source into first, second and third color light;

first, second, and third optical modulators that respectively modulate said first, second, and third color light on the basis of a given image signal to emit first, second, and third modulated light, respectively, which are predetermined linearly polarized light;

a color light synthesizer that synthesizes said first, second and third modulated light, said color light synthesizer having a first reflecting film that reflects said first color light, and a second reflecting film that reflects said third color light, said first reflecting film and said second reflecting film being arranged in an X shape;

a polarization axis adjustment device provided between at least one of said first, second and third optical modulators and said color light synthesizer, said polarization axis adjustment device converting the linearly polarized light into circularly polarized light; and a polarizer disposed between the at least one modulator and said polarization axis adjustment device.

2. The projector as claimed in claim 1, wherein said polarization axis adjustment device is a $\lambda/4$ phase plate.

3. The projector as claimed in claim 1, further comprising a modulation control element formed in said optical modulators, said polarization axis adjustment device being provided between said optical modulators and said color light synthesizer for color light of relatively short wavelength among said first, second and third color light.

4. The projector as claimed in claim 1, said polarization axis adjustment device being provided between said optical modulators and said color light synthesizer for color light having a relatively high spectral intensity among said first, second and third color light.

5. A projector, comprising:

a light source;

a color separator that separates light from said light source into first, second and third color light;

first, second, and third optical modulators that respectively modulate said first, second, and third color light on the basis of a given image signal to emit first, second, and third modulated light, respectively, which are predetermined linearly polarized light;

a color light synthesizer that synthesizes said first, second and third modulated light, said color light synthesizer having a first reflecting film that reflects said first color light, and a second reflecting film that reflects said third color light, said first reflecting film and said second reflecting film being arranged in an X shape;

a polarization axis adjustment device provided between at least one of said first, second and third optical modulators and said color light synthesizer, said polarization axis adjustment device being a $\lambda/2$ phase plate and adjusting the polarization axis of the linearly polarized light to a predetermined angle with respect to a line of intersection of said first reflecting film and said second reflecting film, said predetermined angle being an angle in the range of about 10 degrees to about 45 degrees; and a polarizer disposed between the at least one modulator and said polarization axis adjustment device.

6. The projector as claimed in claim 5, wherein said predetermined angle is about 45 degrees.

7. The projector as claimed in claim 5, further comprising a modulation control element formed in said optical modulators, said polarization axis adjustment device being provided between said optical modulators and said color light synthesizer for color light of relatively short wavelength among said first, second and third color light.

8. The projector as claimed in claim 5, said polarization axis adjustment device being provided between said optical modulators and said color light synthesizer for color light having a relatively high spectral intensity among said first, second and third color light.

9. A projector, comprising:

a light source;

a color separator that separates light from said light source into first, second and third color light;

first, second, and third optical modulators that respectively modulate said first, second, and third color light on the basis of a given image signal to emit first, second, and third modulated light, respectively, which are predetermined linearly polarized light;

a color light synthesizer that synthesizes said first, second and third modulated light, said color light synthesizer having a first reflecting film that reflects said first color light, and a second reflecting film that reflects said third color light, said first reflecting film and said second reflecting film being arranged in an X shape;

a polarization axis adjustment device that adjusts a polarization axis of the linearly polarized light to a first predetermined angle with respect to a line of intersection of said first reflecting film and said second reflecting film, the polarization axis adjustment device being provided between said light source and at least one of said first, second, and third optical modulators; and a polarizer provided on an emitting side surface of said optical modulators corresponding to said polarization axis adjustment device, the polarizer transmitting only linearly polarized light emitted from said optical modulators having a polarization axis of a predetermined second angle with respect to a line of intersection of said first reflecting film and said second reflecting film, wherein said first angle is an angle in the range of about 10 degrees to about 45 degrees, and said second angle is substantially equal to said first angle or different from said first angle by approximately 90 degrees.

10. The projector as claimed in claim 9, wherein said polarization axis adjustment device is a $\lambda/2$ phase plate.

11. The projector as claimed in claim 9, wherein said first angle is about 45 degrees.

12. A projector, comprising:

a light source;

a color separator that separates light from said light source into first, second and third color light;

first, second, and third optical modulators that respectively modulate said first, second, and third color light on the basis of a given image signal to emit first, second, and third modulated light, respectively, which are predetermined linearly polarized light;

a color light synthesizer that synthesizes said first, second and third modulated light, said color light synthesizer having a first reflecting film that reflects said first color light, and a second reflecting film that reflects said third color light, said first reflecting film and said second reflecting film being arranged in an X shape;

a polarization axis adjustment device provided between at least one of said first, second and third optical modulators and said color light synthesizer;

a polarizer disposed between the at least one modulator and said polarization axis adjustment device; and a color absorption device that absorbs only color light passing through said polarization axis adjustment device, the color absorption device being provided in an optical path between said optical modulators and said light synthesizer where said polarization axis adjustment device is not provided, said polarization axis adjustment device being placed on only one or two optical axis.

13. The projector as claimed in claim 12, further comprising a modulation control element formed in said optical modulators, said polarization axis adjustment device being provided between said optical modulators and said color light synthesizer for color light of relatively short wavelength among said first, second and third color light.

14. The projector as claimed in claim 12, said polarization axis adjustment device being provided between said optical modulators and said color light synthesizer for color light having a relatively high spectral intensity among said first, second and third color light.

15. The projector as claimed in claim 9, further comprising a color absorption device that absorbs only color light passing through said polarization axis adjustment device, the color absorption device being provided in an optical path between said optical modulators and said light synthesizer where said polarization axis adjustment device is not provided, said polarization axis adjustment device being placed on only one or two optical axis.

* * * * *